US012391049B2

(12) United States Patent
Hayashi et al.

(10) Patent No.: US 12,391,049 B2
(45) Date of Patent: Aug. 19, 2025

(54) LIQUID CONSUMING DEVICE INCLUDING AIR TANK AND LIQUID TANK EACH COMMUNICABLE WITH ATMOSPHERE WHEN CONNECTED TO LIQUID CONTAINER

(71) Applicant: BROTHER KOGYO KABUSHIKI KAISHA, Nagoya (JP)

(72) Inventors: Masahiro Hayashi, Nishio (JP); Naoya Okazaki, Hashima (JP); Yuma Tanabe, Nagoya (JP); Satoru Oki, Nagoya (JP); Nanami Abe, Niigata (JP); Yuji Fukuta, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 85 days.

(21) Appl. No.: 18/167,990

(22) Filed: Feb. 13, 2023

(65) Prior Publication Data

US 2023/0311532 A1 Oct. 5, 2023

(30) Foreign Application Priority Data

Mar. 30, 2022 (JP) ................................ 2022-054896

(51) Int. Cl.
*B41J 2/175* (2006.01)

(52) U.S. Cl.
CPC ....... *B41J 2/17556* (2013.01); *B41J 2/17503* (2013.01); *B41J 2/17509* (2013.01); *B41J 2/17523* (2013.01); *B41J 2/175* (2013.01)

(58) Field of Classification Search
CPC ........................ B41J 2/17556; B41J 2/17503; B41J 2/17509; B41J 2/17523; B41J 2/175
See application file for complete search history.

(56) References Cited

U.S. PATENT DOCUMENTS

| | | | |
|---|---|---|---|
| 6,520,630 B1 | 2/2003 | Oda et al. | |
| 10,618,302 B2 * | 4/2020 | Sato | B41J 2/17596 |
| 2019/0030910 A1 | 1/2019 | Tanabe et al. | |
| 2021/0300052 A1 | 9/2021 | Takei et al. | |

FOREIGN PATENT DOCUMENTS

| | | |
|---|---|---|
| JP | 2001-187459 A | 7/2001 |
| JP | 2019-25818 A | 2/2019 |
| JP | 2021-151724 A | 9/2021 |

* cited by examiner

*Primary Examiner* — Geoffrey S Mruk
(74) *Attorney, Agent, or Firm* — Merchant & Gould P.C.

(57) ABSTRACT

A liquid consuming device includes a liquid container, an air tank, a liquid tank, and an ejection head. The liquid container is connectable to the air tank and the liquid tank. The air tank includes: an air flow path; an air chamber configured to communicate with a first storage chamber of the liquid container through the air flow path; and a first air communicating portion. The liquid tank includes: a liquid flow path; a second storage chamber configured to communicate with the first storage chamber through the liquid flow path; a liquid outlet port to allow liquid in the second storage chamber to flow out therefrom; and a second air communicating portion. The air flow path is configured to provide communication between the first storage chamber and the air chamber in a state where the liquid container is connected to the air tank and the liquid tank.

20 Claims, 13 Drawing Sheets

LIQUID CONSUMING DEVICE INCLUDING AIR TANK AND LIQUID TANK EACH COMMUNICABLE WITH ATMOSPHERE WHEN CONNECTED TO LIQUID CONTAINER

REFERENCE TO RELATED APPLICATIONS

This application claims priority from Japanese Patent Application No. 2022-054896 filed on Mar. 30, 2022. The entire content of the priority application is incorporated herein by reference.

BACKGROUND ART

There has been known a liquid supplying device including a liquid ejection head, a liquid storage tank in communication with the liquid ejection head, and a liquid cartridge attachable to and detachable from the liquid storage tank.

DESCRIPTION

In this conventional liquid supplying device, the liquid storage tank is made in communication with the atmosphere through an air communicating portion, and the cartridge attached to the liquid storage tank is in air communication with the liquid storage tank through a second connecting portion. Hence, the cartridge is in communication with the atmosphere through the air communicating portion of the liquid storage tank.

Accordingly, in this liquid supplying device, it is difficult to set a difference in flow resistance between during inflow of gas into the liquid storage tank and during inflow of gas into the cartridge, since the liquid storage tank and the cartridge are both in communication with the atmosphere through the single air communicating portion. Particularly, in a case where a semi-permeable membrane is provided at the air communicating portion, the semi-permeable membrane has a predominant influence on the flow resistance, and, hence, it becomes difficult to set the flow resistance during the inflow of gas into the liquid storage tank to be greater than the flow resistance during the inflow of gas into the cartridge.

For example, liquid flows out of the liquid storage tank and the cartridge if a large amount of liquid is ejected through the liquid ejection head. If the amount of liquid following out of the cartridge is smaller than the amount of liquid flowing out of the liquid storage tank, the amount of the liquid stored in the liquid storage tank may decrease while liquid is ejected through the liquid ejection head, although liquid is still stored in the cartridge. On the other hand, if an air communicating portion is provided in the cartridge, the cartridge may have a complicated structure, and hence, the cartridge may become costly, and may have to be configured as a disposable cartridge.

In view of the foregoing, it is an object of the disclosure to provide a liquid consuming device capable of easily setting a difference in flow resistance between a liquid container and a liquid tank while realizing a simple structure for the liquid container.

In order to attain the above and other objects, according to one aspect, the disclosure provides a liquid consuming device including a liquid container, an air tank, a liquid tank, and an ejection head. The liquid container is connectable to the air tank and to the liquid tank. The liquid container includes a first storage chamber configured to store liquid therein. The air tank includes an air flow path, an air chamber, and a first air communicating portion. The air flow path is configured to communicate with the first storage chamber of the liquid container that is connected to the air tank. The air chamber is connected to the air flow path and is configured to communicate with the first storage chamber through the air flow path to provide airflow between the first storage chamber and the air chamber. The first air communicating portion is configured to allow the air chamber to communicate with an atmosphere. The liquid tank includes a liquid flow path, a second storage chamber, a liquid outlet port, and a second air communicating portion. The liquid flow path is configured to communicate with the first storage chamber of the liquid container that is connected to the liquid tank. The second storage chamber is connected to the liquid flow path and is configured to communicate with the first storage chamber through the liquid flow path to allow the liquid stored in the first storage chamber to flow into the second storage chamber. The liquid stored in the second storage chamber is configured to flow out therefrom through the liquid outlet port. The second air communicating portion is configured to allow the second storage chamber to communicate with the atmosphere. The ejection head is configured to eject the liquid supplied from the second storage chamber through the liquid outlet port. The air flow path is configured to provide communication between the first storage chamber and the air chamber in a state where the liquid container is connected to the air tank and the liquid tank.

With this structure, since air flows into the first storage chamber from the first air communicating portion through the air chamber and the air flow path, the flow resistance of this passage of air can be set to an optimum value to allow the liquid stored in the first storage chamber to flow into the second storage chamber. On the other hand, the flow resistance of the second air communicating portion can also be set to an optimum value to allow the liquid in the second storage chamber to flow out therefrom through the liquid outlet port. Further, since no air communicating portion is necessary in the liquid container, the liquid container can have a simplified structure.

According to another aspect, the disclosure also provides a liquid consuming device including a liquid container, an air flow path, an air chamber, a first air communicating portion, a liquid flow path, a second storage chamber, a liquid outlet port, a second air communicating portion, and an ejection head. The liquid container includes a first storage chamber configured to store liquid therein. The air flow path is configured to communicate with the first storage chamber of the liquid container. The air chamber is connected to the air flow path and is configured to communicate with the first storage chamber through the air flow path to provide airflow between the first storage chamber and the air chamber. The first air communicating portion is configured to allow the air chamber to communicate with an atmosphere. The liquid flow path is configured to communicate with the first storage chamber of the liquid container. The second storage chamber is connected to the liquid flow path and is configured to communicate with the first storage chamber through the liquid flow path to allow the liquid stored in the first storage chamber to flow into the second storage chamber. The liquid stored in the second storage chamber is configured to flow out therefrom through the liquid outlet port. The second air communicating portion is configured to allow the second storage chamber to communicate with the atmosphere. The ejection head is configured to eject the liquid supplied from the second storage chamber through the liquid outlet port. The air flow path is configured to provide communication between the first storage chamber and the air chamber in a state where the first storage chamber is in communication with the second storage chamber. The second storage chamber and the air chamber are not in communication with each other in a state where the first communication chamber is not in communication with each of the second storage chamber and the air chamber. The air chamber has a volume which is smaller than a volume of the second storage chamber.

With this structure, since air flows into the first storage chamber from the first air communicating portion through the air chamber and the air flow path, the flow resistance of this passage of air can be set to an optimum value to allow the liquid stored in the first storage chamber to flow into the second storage chamber. On the other hand, the flow resistance of the second air communicating portion can also be set to an optimum value to allow the liquid in the second storage chamber to flow out therefrom through the liquid outlet port. Further, since no air communicating portion is necessary in the liquid container, the liquid container can have a simplified structure.

Figure 8:
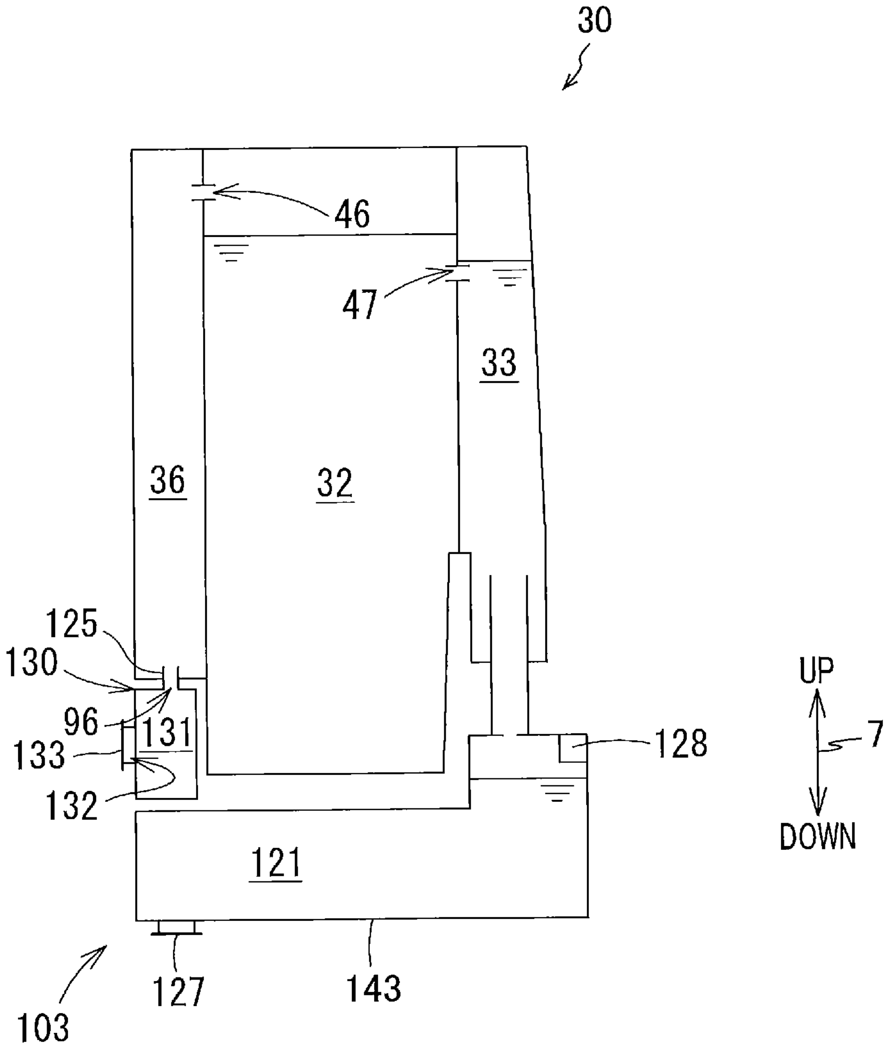

FIG. 8 is a schematic view illustrating a positional relationship among the ink cartridge 30, an ink tank 103, and a buffer tank 130 of the cartridge receiving portion 110 in a state where the multifunction device is in a collapsed posture.

Figure 9:
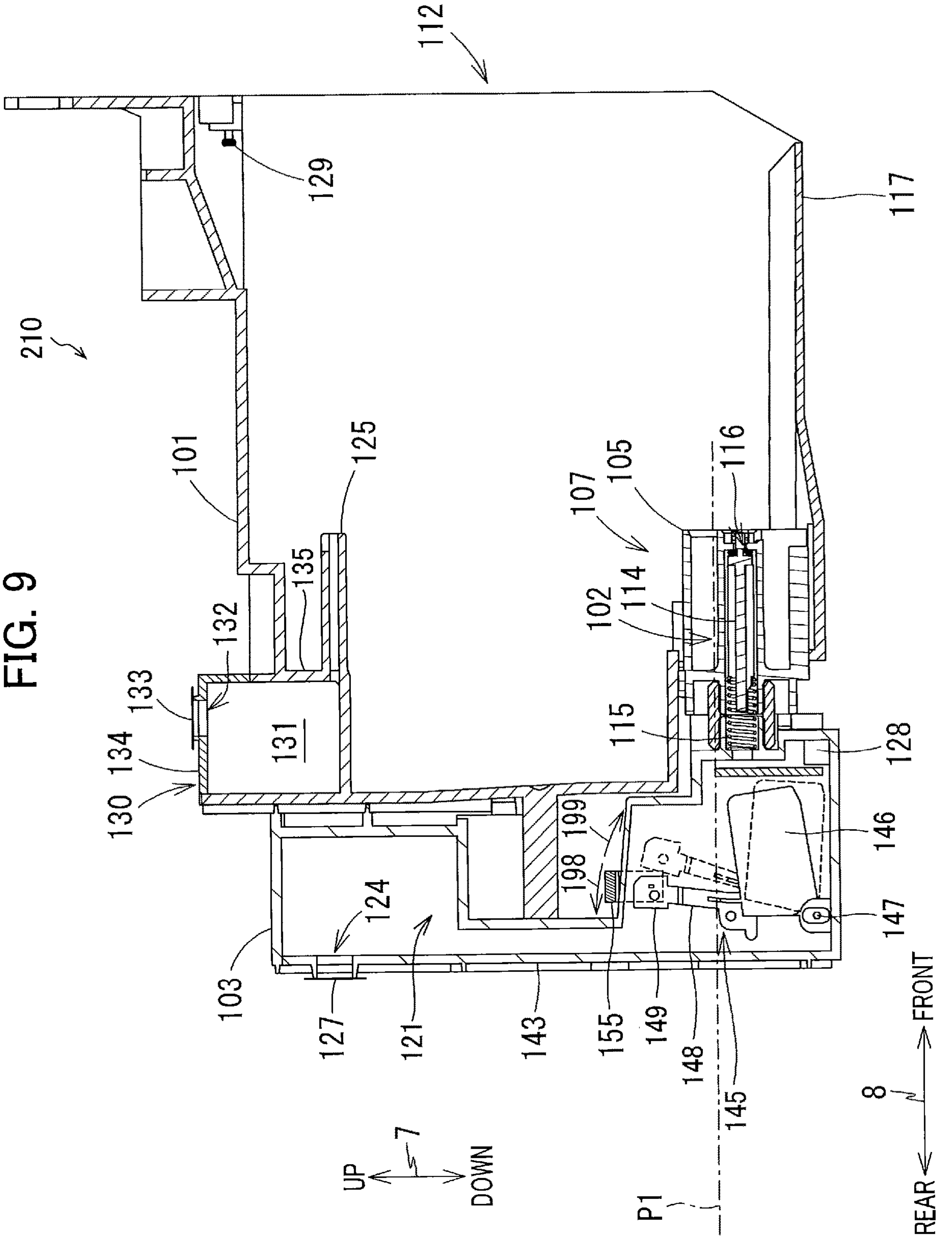

FIG. 9 is a vertical cross-sectional view of a cartridge receiving portion 210 according to a first modification to the embodiment.

Figure 10:
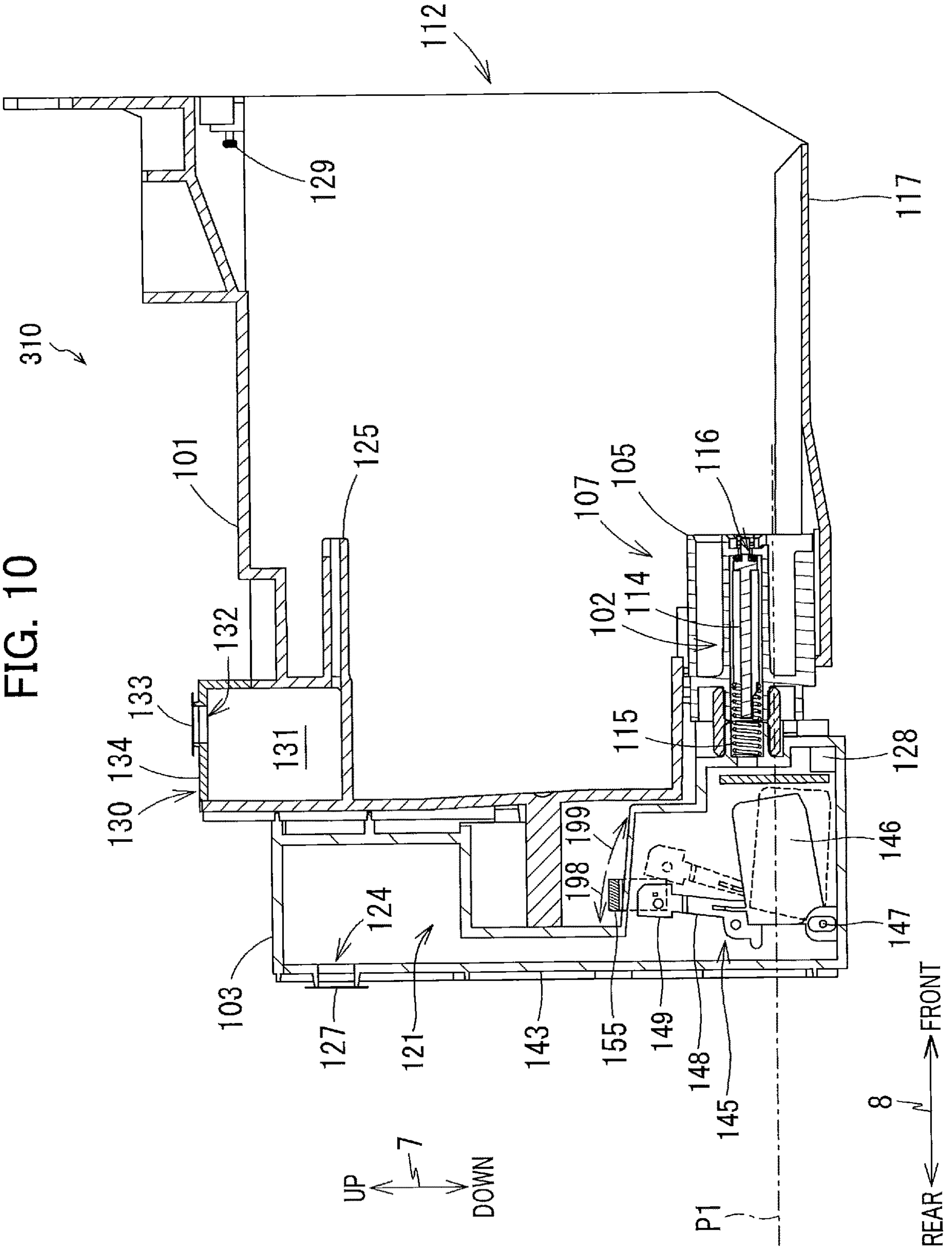

FIG. 10 is a vertical cross-sectional view of a cartridge receiving portion 310 according to a second modification to the embodiment.

Figure 11:
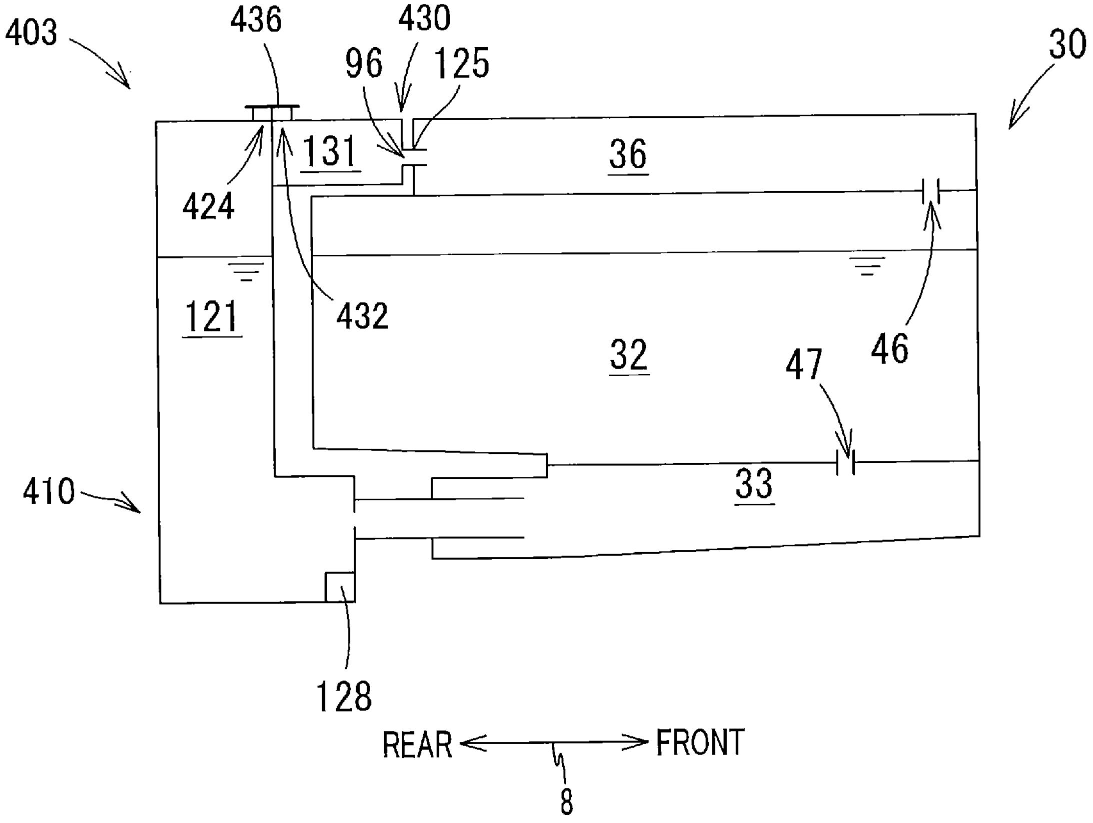

FIG. 11 is a schematic view illustrating a positional relationship among the ink cartridge 30, an ink tank 403, and a buffer tank 430 of a cartridge receiving portion 410 according to a third modification to the embodiment.

Figure 12:
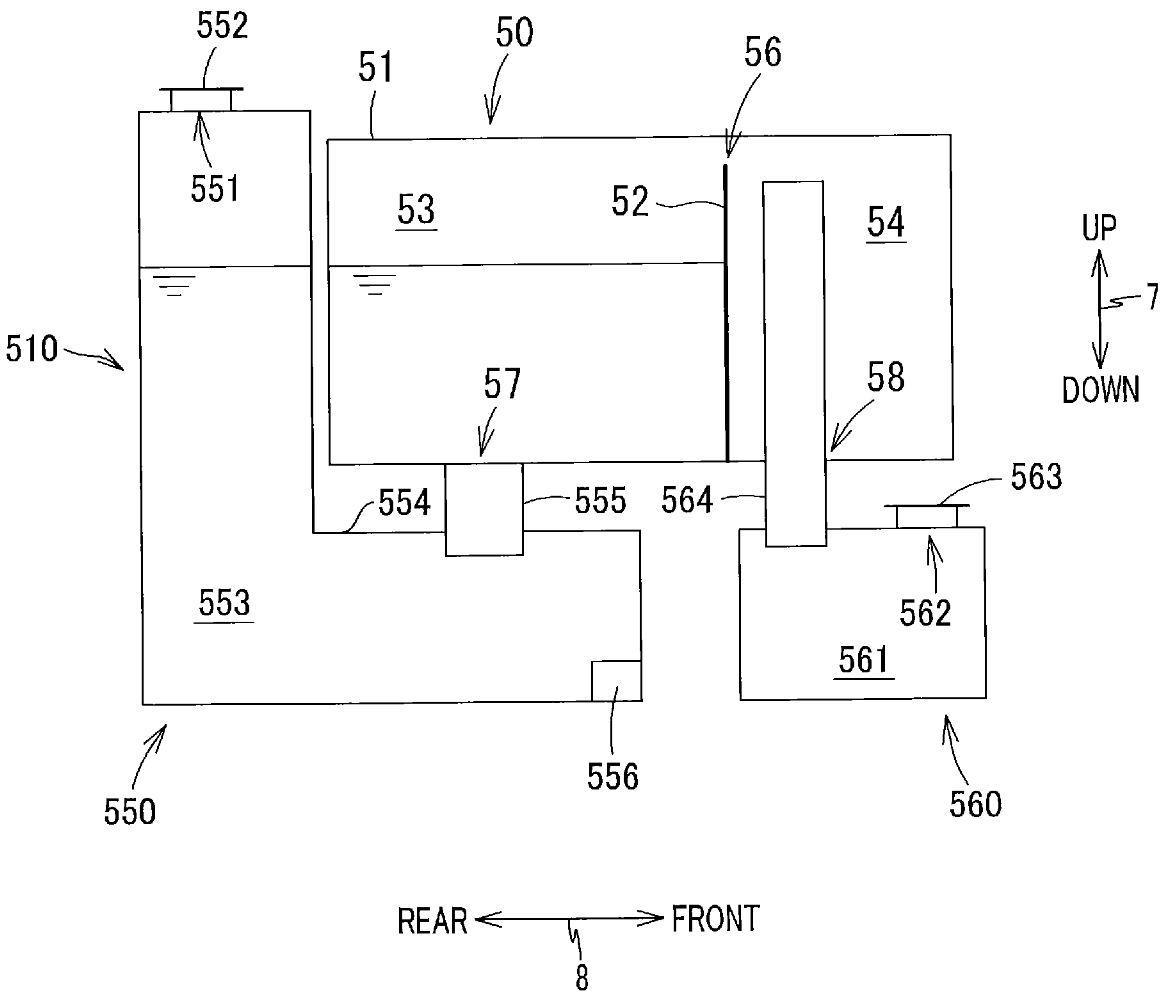

FIG. 12 is a schematic view illustrating a positional relationship among an ink cartridge 50, an ink tank 550, and a buffer tank 560 of a cartridge receiving portion 510 according to a fourth modification to the embodiment.

Figure 13:
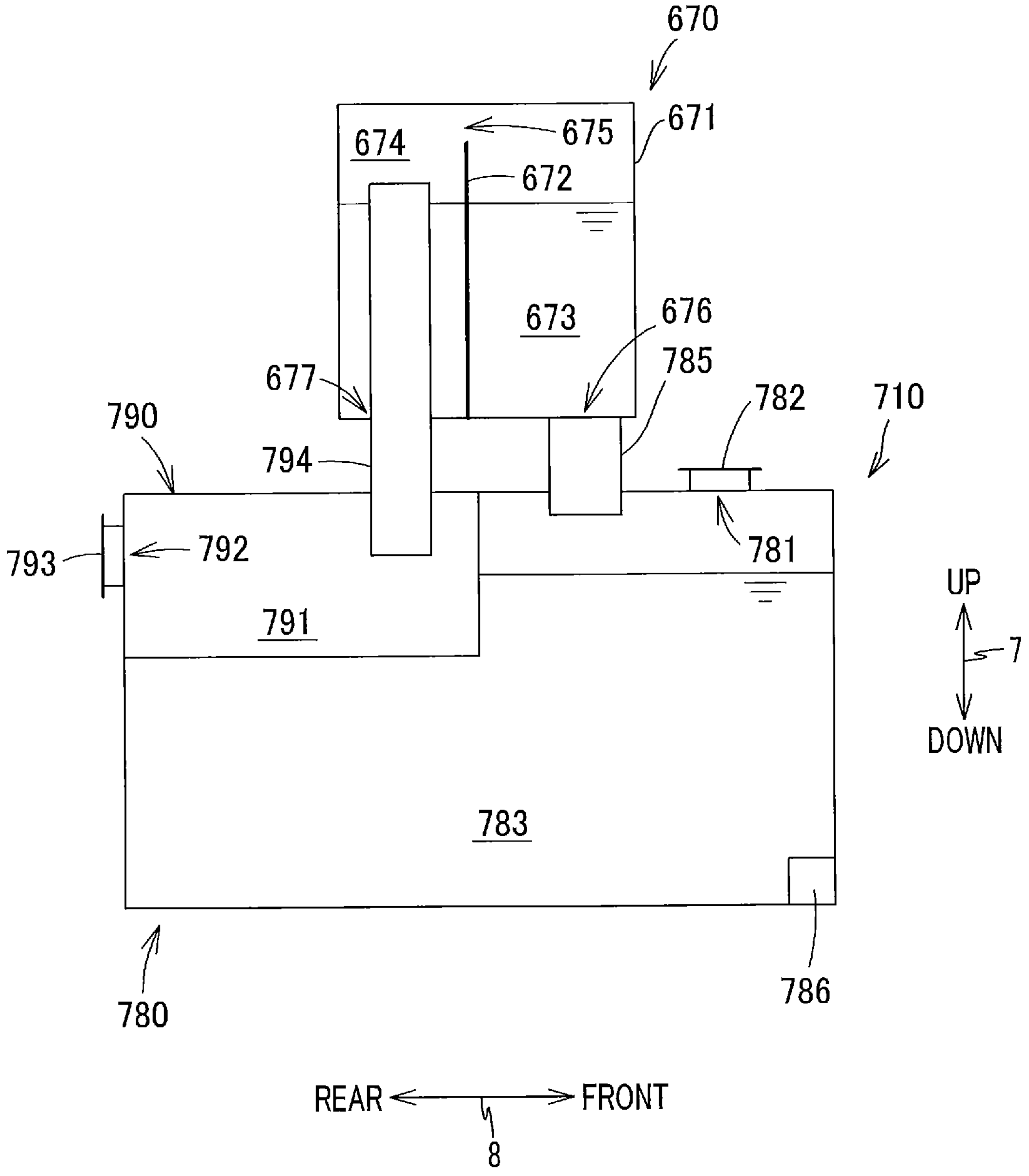

FIG. 13 is a schematic view illustrating a positional relationship among a bottle 670, an ink tank 780, and a buffer tank 790 of a cartridge receiving portion 710 according to a fifth modification to the embodiment.

EMBODIMENT

Hereinafter, one embodiment of the present disclosure will be described with reference to FIGS. 1 through 8.

Throughout the specification, a multifunction device 10 according to the embodiment will be described assuming that the multifunction device 10 is resting on a horizontal surface illustrated in FIG. 1. Hereinafter, this posture of the multifunction device 10 illustrated in FIG. 1 will be referred to as an "operable posture".

Specifically, an up-down direction 7 will be defined based on the operable posture of the multifunction device 10. A front-rear direction 8 will be referred to assuming that a surface of the multifunction device 10 at which an opening 13 is formed (the near side in FIG. 1) is a front surface 14A of the multifunction device 10 in the operable posture. A left-right direction 9 will be referred to assuming that the multifunction device 10 in the operable posture is viewed from its front side. In the present embodiment, in the operable posture of the multifunction device 10, the up-down direction 7 corresponds to the vertical direction, and the front-rear direction 8 and the left-right direction 9 are both horizontal. The front-rear direction 8 and the left-right direction 9 are perpendicular to each other.

<Overall Structure of Multifunction Device 10>

Figure 1A:
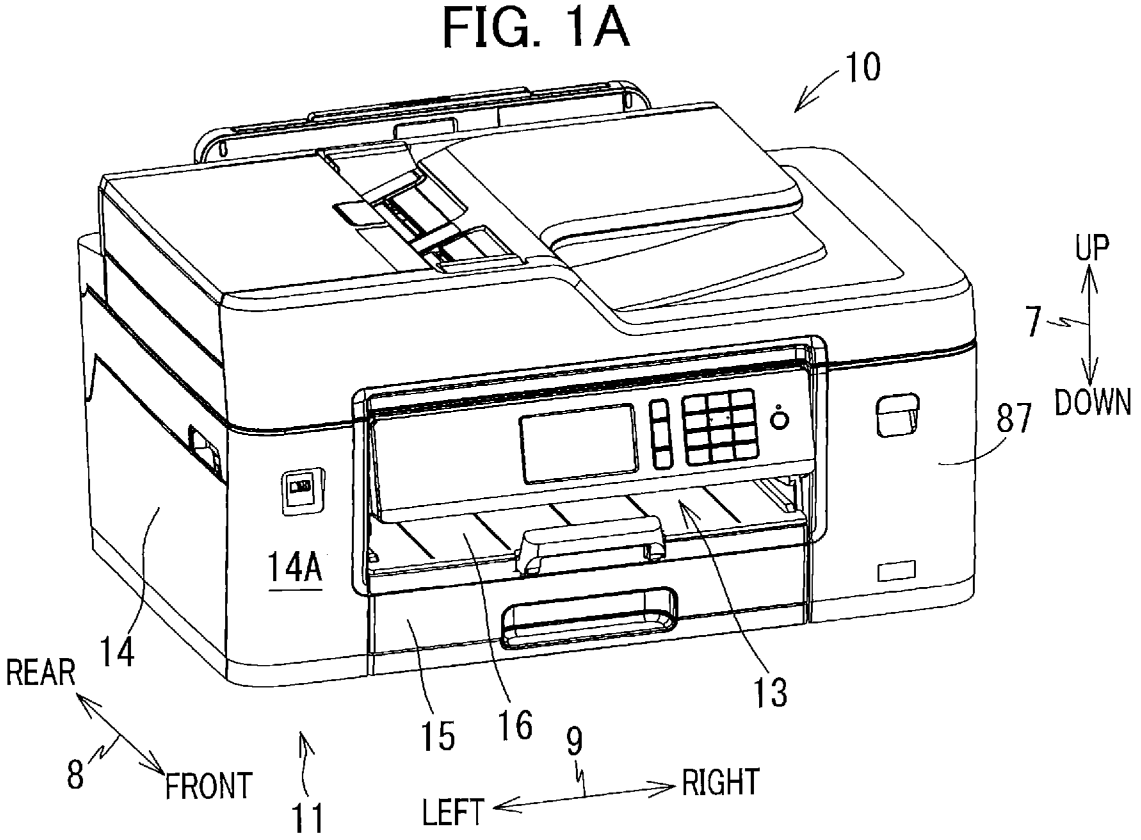
FIG. 1A is a perspective view of a multifunction device 10 according to one embodiment in a state where a cover 87 is at a closed position thereof.
Figure 1B:
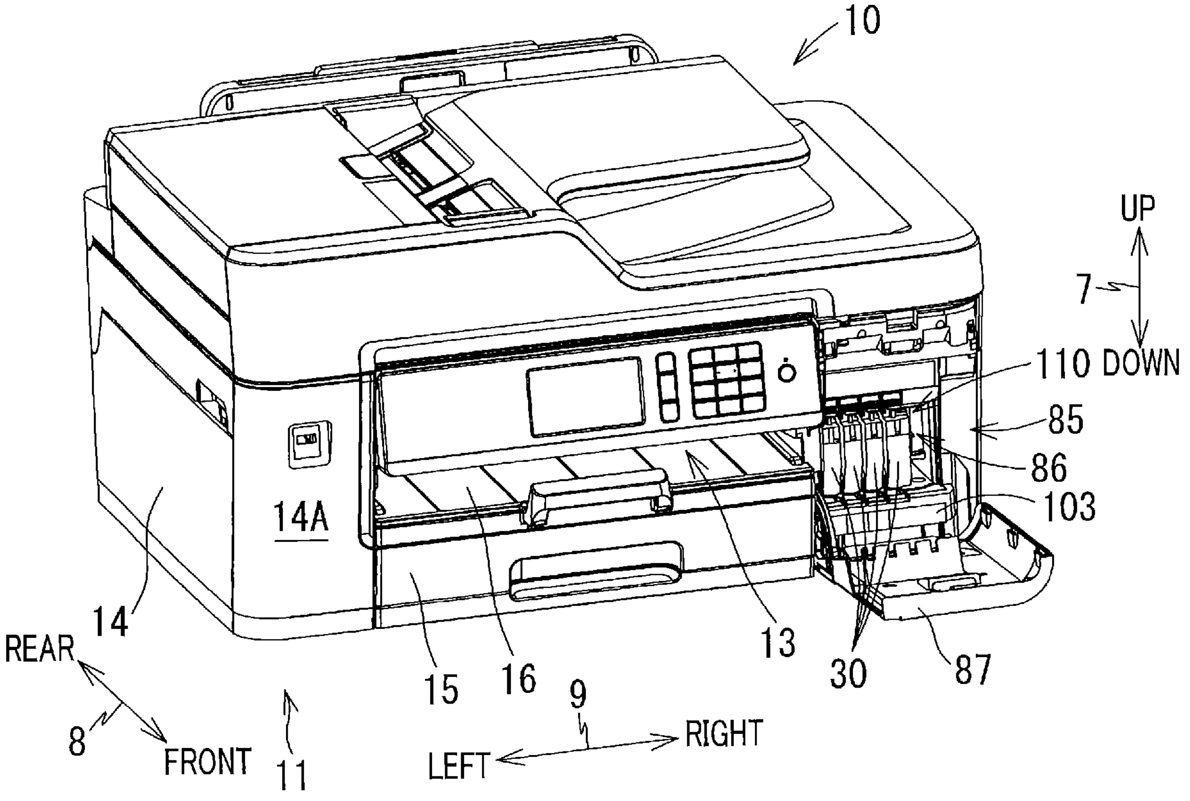
FIG. 1B is a perspective view of the multifunction device 10 in a state where the cover 87 is at an open position thereof.

As illustrated in FIGS. 1A and 1B, the multifunction device 10 has a lower portion where a printer portion 11 is provided. The printer portion 11 is configured to form an image on a sheet 12 (see FIG. 2) based on an inkjet recording system. The multifunction device 10 may have various other functions such as a facsimile function, a scanning function, and a copying function. The printer portion 11 includes a housing 14 having a generally rectangular parallelepiped shape. The housing 14 has a front surface 14A formed with the opening 13.

Figure 2:
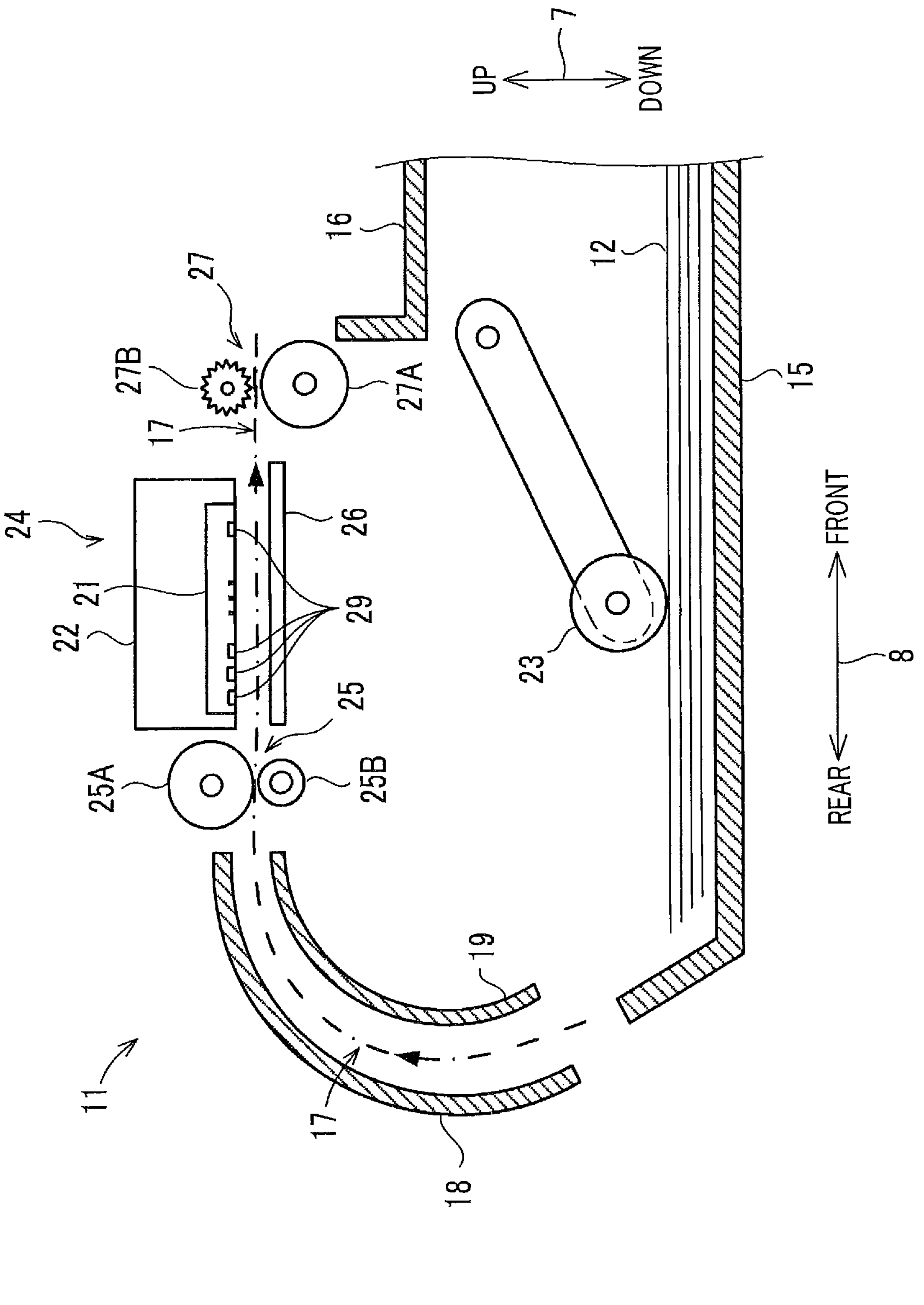
FIG. 2 is a schematic vertical cross-sectional view illustrating an internal structure of a printer portion 11 of the multifunction device 10.

As illustrated in FIG. 2, a sheet tray 15, a discharge tray 16, a pick-up roller 23, a pair of conveyor rollers 25, a pair of discharge rollers 27, a recording unit 24, and a platen 26 are provided in an internal space of the housing 14.

<Sheet Tray 15, Discharge Tray 16, and Pick-Up Roller 23>

As illustrated in FIGS. 1A and 1B, the opening 13 is open on the front surface 14A of the housing 14 at a generally center thereof in the left-right direction 9. The sheet tray 15 is configured to be inserted into and removed from the housing 14 through the opening 13 in the front-rear direction 8. The sheet tray 15 is configured to support a stack of sheets 12. The discharge tray 16 is positioned above the sheet tray 15. The discharge tray 16 is configured to support the sheet 12 discharged through a gap between the recording unit 24 and the platen 26 by the pair of discharge rollers 27. The pick-up roller 23 is configured to be rotated by a motor (not illustrated) to feed each sheet 12 supported on the sheet tray 15 onto a conveying path 17.

<Conveying Path 17>

As illustrated in FIG. 2, the conveying path 17 is a space defined mainly by guide members 18, 19, the recording unit 24, and the platen 26. In the printer portion 11, the guide members 18 and 19 face each other with a predetermined gap therebetween and the recording unit 24 and the platen 26 face each other with a predetermined gap therebetween. The conveying path 17 extends upward from a rear end portion of the sheet tray 15, makes a U-turn frontward, and extends through the gap between the recording unit 24 and the platen 26 to reach the discharge tray 16. In FIG. 2, a conveying direction of the sheet 12 (sheet conveying direction) is indicated by a dashed-dotted arrow in FIG. 2.

<Conveyor Rollers 25>

The pair of conveyor rollers 25 is positioned upstream of the recording unit 24 in the sheet conveying direction. The pair of conveyor rollers 25 includes a conveyor roller 25A and a pinch roller 25B opposing each other. The conveyor roller 25A is configured to be driven by a motor (not illustrated). The pinch roller 25B is configured to be rotated following the rotation of the conveyor roller 25A. As the conveyor roller 25A makes forward rotation in response to forward rotation of the non-illustrated motor, each sheet 12 is conveyed in the sheet conveying direction with the sheet 12 nipped between the conveyor roller 25A and the pinch roller 25B.

<Discharge Rollers 27>

The pair of discharge rollers 27 is positioned downstream of the recording unit 24 in the sheet conveying direction. The pair of discharge rollers 27 includes a discharge roller 27A and a spur 27B opposing each other. The discharge roller 27A is configured to be driven by the non-illustrated motor. The spur 27B is configured to be driven following the rotation of the discharge roller 27A. As the discharge roller 27A makes forward rotation in response to the forward rotation of the non-illustrated motor, each sheet 12 is nipped between the discharge roller 27A and the spur 27B and is conveyed in the sheet conveying direction.

<Recording Unit 24 and Platen 26>

As illustrated in FIG. 2, the recording unit 24 and the platen 26 are positioned between the pair of conveyor rollers 25 and the pair of discharge rollers 27 in the sheet conveying direction. Specifically, the recording unit 24 and the platen 26 are positioned downstream of the pair of conveyor rollers 25 and upstream of the pair of discharge rollers 27 in the sheet conveying direction. Further, the recording unit 24 and the platen 26 are positioned to face each other in the up-down direction 7.

The recording unit 24 includes a carriage 22, and an ejection head 21 mounted on the carriage 22. The carriage 22 is reciprocally movable in the left-right direction 9 upon receipt of a driving force from a motor (not illustrated). The ejection head 21 has a lower surface where a plurality of nozzles 29 is formed. The ejection head 21 is configured to eject ink droplets from the nozzles 29 through oscillation of oscillating elements such as piezoelectric elements. The ejection head 21 ejects ink droplets from selected nozzles 29 onto the sheet 12 supported by the platen 26 while the carriage 22 moves, thereby forming an image on the sheet 12.

In the operable posture of the multifunction device 10, the lower surface of the ejection head 21 is positioned higher than a level of ink stored in an ink cartridge 30 (described later) received in a cartridge receiving portion 110 (see FIG. 3, described later) and a level of ink stored in an ink tank 103 (see FIG. 4, described later). Further, in the operable posture of the multifunction device 10, the ejection head 21 is positioned rearward of the cartridge receiving portion 110 in the front-rear direction 8.

A bundle of ink tubes (not illustrated) and a flexible flat cable (not illustrated) are connected to the carriage 22. The ink tubes connect the cartridge receiving portion 110 to the ejection head 21. Specifically, the ink tubes are configured to supply ink stored in each of the ink cartridges 30 received in the cartridge receiving portion 110 to the ejection head 21. In the embodiment, a bundle of four ink tubes is provided to allow circulation of ink of four different colors of black, magenta, cyan, and yellow, respectively, from the respective ink cartridges 30 to the ejection head 21. The flexible flat cable is configured to provide electrical connection between the ejection head 21 and a control board (not illustrated) configured to control operations of the multifunction device 10.

<Cover 87>

As illustrated in FIG. 1B, the front surface 14A of the housing 14 has a right end portion where an opening 85 is formed. The housing 14 includes a cover 87 for opening and closing the opening 85. Specifically, the cover 87 is pivotable between a closed position (FIG. 1A) where the cover 87 closes the opening 85 and an open position (FIG. 1B) where the cover 87 opens the opening 85. The cover 87 has a lower end supported by the housing 14 such that the cover 87 is pivotally movable about a pivot axis extending in the left-right direction 9. To the rear beyond the opening 85 in the internal space of the housing 14, an accommodation space 86 is provided to accommodate the cartridge receiving portion 110 therein.

<Cartridge Receiving Portion 110>

Figure 3:
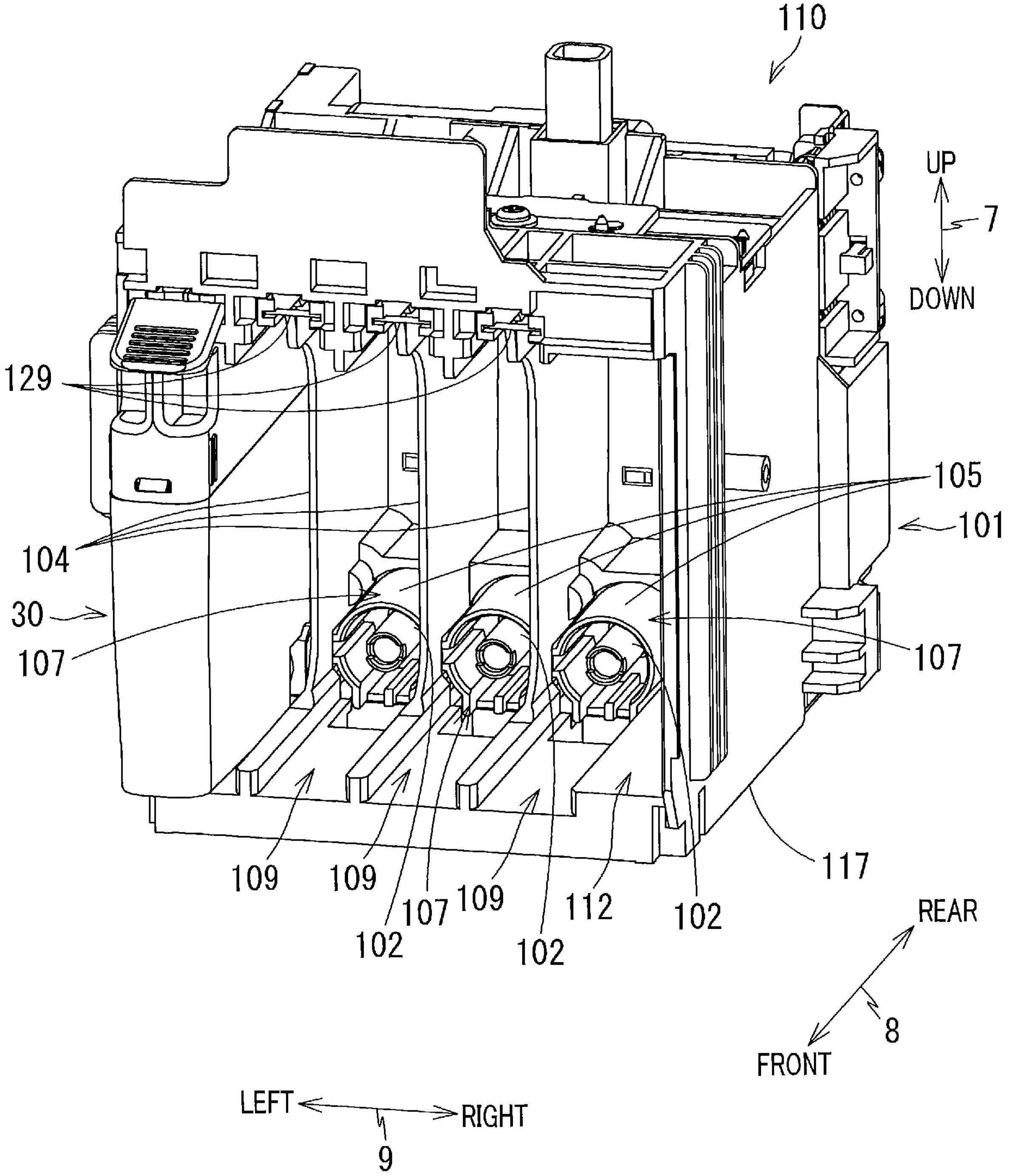
FIG. 3 is a perspective view illustrating an exterior of a cartridge receiving portion 110 as viewed from an opening 112 side thereof.
Figure 4:
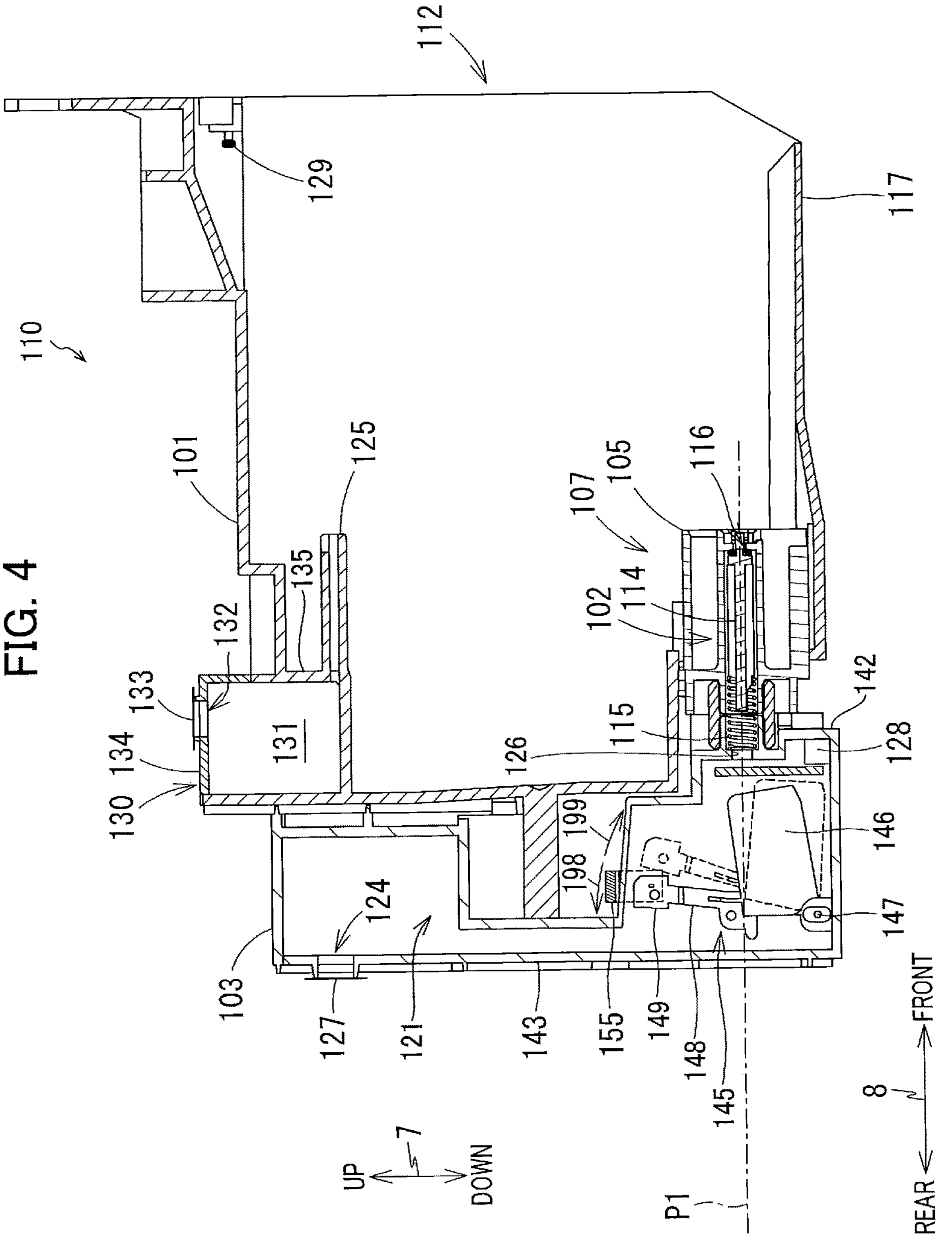
FIG. 4 is a vertical cross-sectional view of the cartridge receiving portion 110.

As illustrated in FIGS. 3 and 4, the cartridge receiving portion 110 includes a cartridge case 101, four rods 125, a locking portion 129, four buffer tanks 130, four ink tanks 103, four pivot members 145, and four liquid-level sensors 155.

Four ink cartridges 30 corresponding to the colors of cyan, magenta, yellow, and black can be accommodated in the cartridge receiving portion 110. A set of one rod 125, one buffer tank 130, one ink tank 103, one pivot member 145, and one liquid-level sensor 155 is provided for each of the four ink cartridges 30. Incidentally, the number of the ink cartridges 30 to be received in the cartridge receiving portion 110 need not be four. FIG. 3 illustrates a state where only one ink cartridge 30 is accommodated in a leftmost end space in the cartridge receiving portion 110.

The cartridge case 101 constitutes an outer shell of the cartridge receiving portion 110. The cartridge case 101 has a box-like shape providing an internal space therein for accommodating the ink cartridges 30. The cartridge case 101 has a rear end wall (without reference numeral) and a front open end defining an opening 112. The opening 112 is thus opposite the rear end wall in the front-rear direction 8 and is exposed to an outside of the multifunction device 10 through the opening 85 of the housing 14 when the cover 87 is at the open position.

The ink cartridges 30 are inserted rearward in the cartridge receiving portion 110 and are removed frontward from the cartridge receiving portion 110 through the opening 85 of the housing 14 and the opening 112 of the cartridge receiving portion 110. The cartridge case 101 includes a bottom wall 117 where guide grooves 109 are formed for guiding the insertion and removal of the respective ink cartridges 30 in the front-rear direction 8. The guide grooves 109 extend in the front-rear direction 8, and are arranged in line in the left-right direction 9 at intervals. The guide grooves 109 receive lower end portions of the respective ink cartridges 30 to guide movements of the ink cartridges 30 in the front-rear direction 8. Three plates 104 are provided in the internal space of the cartridge case 101 to partition the internal space into four individual spaces juxtaposed with one another in the left-right direction 9. Each of the four spaces partitioned by the plates 104 is configured to receive one of the four ink cartridges 30 storing ink of four different colors.

<Locking Portion 129>

As illustrated in FIGS. 3 and 4, the locking portion 129 extends in the left-right direction 9 at a position adjacent to a top wall and the opening 112 of the cartridge case 101. The locking portion 129 is a rod-like member extending in the left-right direction 9. For example, the locking portion 129 is a solid cylindrical metal rod. The locking portion 129 has both end portions in the left-right direction 9 supported by respective side walls of the cartridge case 101. The locking portion 129 extends through the four spaces each configured to accommodate one of the four ink cartridges 30.

Figure 6:
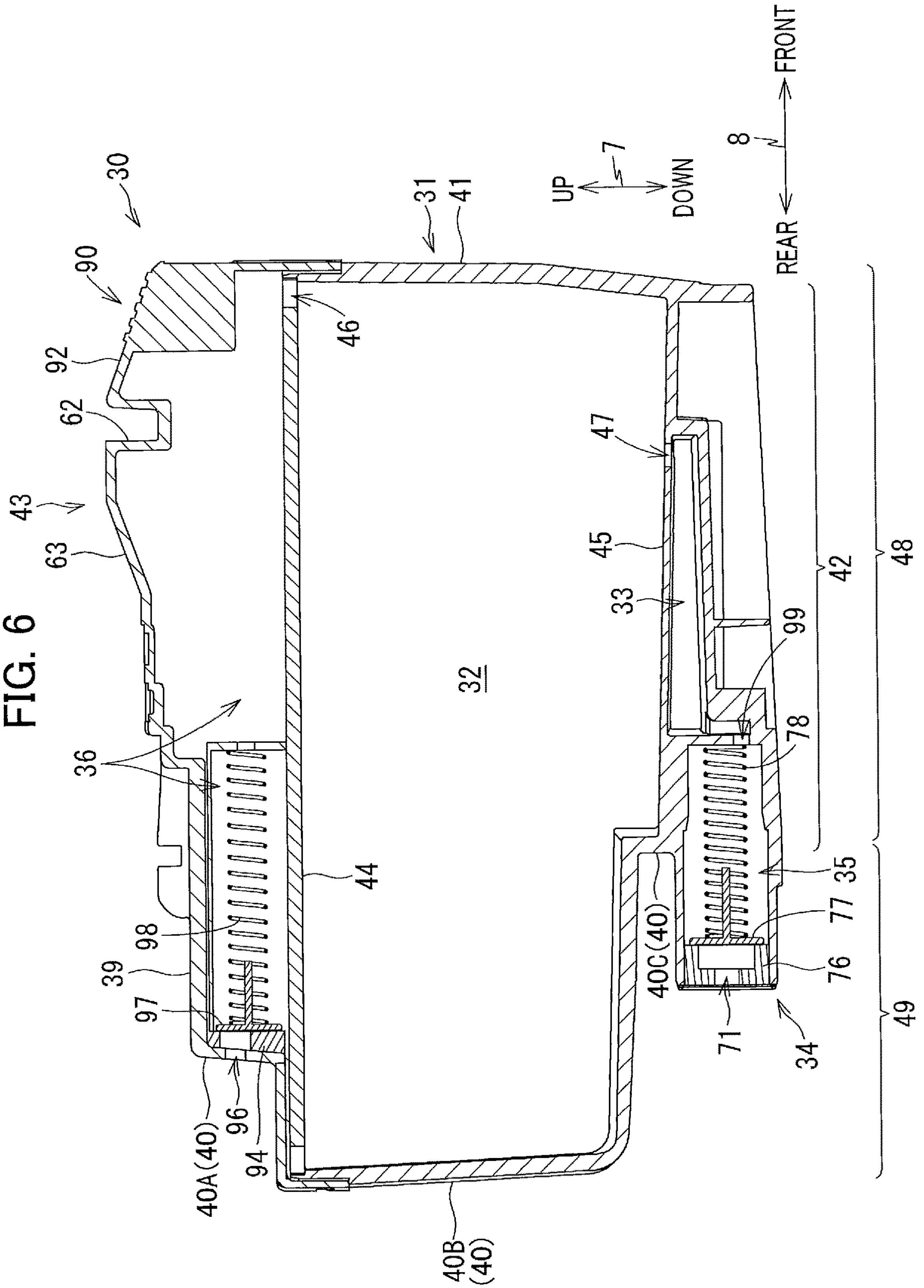
FIG. 6 is a vertical cross-sectional view of the ink cartridge 30.
Figure 7:
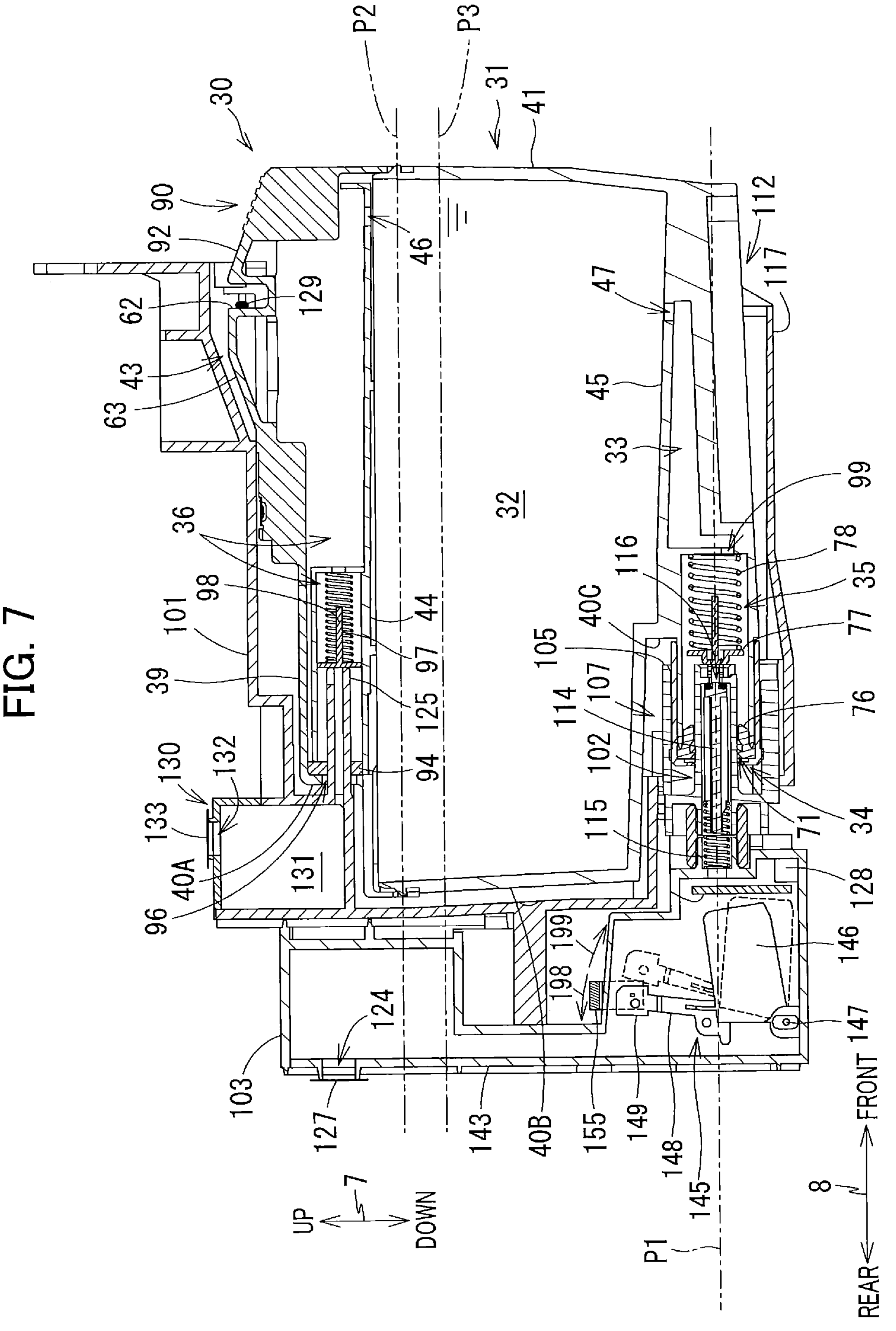
FIG. 7 is a vertical cross-sectional view illustrating a state where the ink cartridge 30 is attached to the cartridge receiving portion 110.

The locking portion 129 is configured to retain each of the ink cartridges 30 accommodated in the cartridge receiving portion 110 at an attached position illustrated in FIG. 7. At the attached position, the ink cartridge 30 is engaged with the locking portion 129. In this way, the locking portion 129 can hold the ink cartridge 30 at the attached position against urging forces of coil springs 78, 98 (see FIG. 6, described later) to urge the ink cartridge 30 rearward.

<Buffer Tank 130>

As illustrated in FIG. 4, the buffer tanks 130 are positioned at an upper portion of the rear end wall of the cartridge case 101. Further, each buffer tank 130 is positioned above a corresponding connecting portion 107 (described later) provided at the rear end wall. Each buffer tank 130 is a box-like container molded integrally with the cartridge case 101. The buffer tank 130 has an internal space serving as an air chamber 131. Each buffer tank 130 includes a top wall 134 formed with an air communication port 132 penetrating the top wall 134 in the up-down direction 7 to be open upward thereon. A first semipermeable membrane 133 is affixed to an upper open end of the air communication port 132 to close the air communication port 132. The first semipermeable membrane 133 allows air to flow therethrough, but interrupts ink from flowing therethrough.

<Rod 125>

As illustrated in FIG. 4, each rod 125 extends frontward from a front wall 135 of the corresponding buffer tank 130 at a lower end portion thereof. Each rod 125 is positioned above the corresponding connecting portion 107 (described later) provided at the rear end wall of the cartridge case 101. The rod 125 has a tubular shape whose hollow space is in communication with the air chamber 131. The rod 125 has a front end that is open frontward and upward. As will be described later, in the state where the ink cartridge 30 is accommodated in the cartridge receiving portion 110, the rod 125 is inserted in an air valve chamber 36 (see FIG. 6) of the ink cartridge 30 through an air communication opening 96 (see FIGS. 5 and 6). As such, the air valve chamber 36 of the ink cartridge 30 is in communication with the air chamber 131 of the corresponding buffer tank 130, and the hollow space of the rod 125 functions as a passage to provide airflow therethrough.

<Ink Tank 103>

As illustrated in FIG. 4, the ink tanks 103 are positioned rearward of the cartridge case 101. Each ink tank 103 includes a front wall 142, a rear wall 143, a lower wall, and side walls. In these walls constituting the ink tank 103, at least regions facing the liquid-level sensor 155 are light transmissive so that light outputted from the liquid-level sensor 155 can pass through these regions.

Each ink tank 103 has a box-like shape defining a storage chamber 121 therein. The storage chamber 121 is independent from the buffer tank 130 and is not in communication with the buffer tank 130. An outlet port 128 is provided at a position adjacent to the lower wall of each ink tank 103 and is connected to the corresponding ink tube. The outlet port 128 is positioned below the corresponding connecting portion 107. Each ink tank 103 is thus in communication with the corresponding ink tube through the corresponding outlet port 128. The ink stored in the storage chamber 121 can flow out therefrom through the outlet port 128 and is supplied to the ejection head 21 through the corresponding ink tube. The storage chamber 121 has an internal volume greater than an internal volume of the air chamber 131 of the corresponding buffer tank 130.

An air communication port 124 is formed at an upper end portion of the rear wall 143 of each storage chamber 121. The air communication port 124 penetrates through the rear wall 143 in the front-rear direction 8. The air communication port 124 is positioned higher than the light transmissive regions of the ink tank 103 facing the liquid-level sensor 155. A second semipermeable membrane 127 is affixed to an open end of the air communication port 124 to close the open end. The second semipermeable membrane 127 interrupts ink flow therethrough but allows air to flow therethrough. The second semipermeable membrane 127 has a flow resistance R2 higher than a flow resistance R1 of the first semipermeable membrane 133 ($R1<R2$).

<Connecting Portion 107>

As illustrated in FIGS. 3 and 4, each connecting portion 107 includes: an ink needle 102 having a tubular shape and made from resin; and a guide portion 105. The ink needle 102 extends frontward from the corresponding ink tank 103. The ink needle 102 has a protruding end in which an opening 116 is formed. The ink needle 102 has an internal space in communication with the storage chamber 121. Further, the ink needle 102 is at a position corresponding to the position of an ink supply portion 34 (see FIGS. 5 and 6, described later) of the corresponding ink cartridge 30 accommodated in the cartridge receiving portion 110. The front wall 142 of the ink tank 103 has a through-hole 126 which provides communication between the internal space of the ink needle 102 and the storage chamber 121.

The guide portion 105 is a hollow cylindrical member positioned to surround the ink needle 102. The guide portion 105 extends frontward from the ink tank 103, and has a protruding end in which an opening is formed. The ink needle 102 is positioned at a diametrical center of the guide portion 105. During the insertion of the ink cartridge 30 into the cartridge receiving portion 110, the ink supply portion 34 moves into the guide portion 105.

In the internal space of the ink needle 102, a valve 114 and a coil spring 115 are accommodated. In the internal space of the ink needle 102, the valve 114 is movable in the front-rear direction 8 between a closed position where the valve 114 closes the opening 116 and an open position where the valve 114 opens the opening 116. The coil spring 115 urges the valve 114 frontward, i.e., in a direction to move the valve 114 toward the closed position. When the valve 114 is at the closed position, a front end of the valve 114 protrudes further frontward relative to the opening 116.

<Pivot Member 145>

The pivot member 145 is positioned inside the storage chamber 121. The pivot member 145 is pivotally movably supported by a support member (not illustrated) disposed in the storage chamber 121. The pivot member 145 is pivotally movable in directions indicated by arrows 198, 199 in FIG. 4. Specifically, the pivot member 145 is pivotable between a first position depicted by a solid line in FIG. 4 and a second position depicted by a broken line in FIG. 4. Further, the pivot member 145 at the first position is restricted from pivoting further in the direction of the arrow 198 by a non-illustrated stopper (for example, an inner surface of the storage chamber 121).

The pivot member 145 includes a float 146, a shaft 147, an arm 148, and a detection-target portion 149.

The float 146 is made from a material having a specific gravity smaller than a specific gravity of the ink stored in the storage chamber 121. The shaft 147 protrudes from right and left surfaces of the float 146 in the left-right direction 9. In the operable posture of the multifunction device 10, the left-right direction 9 is horizontal. Both ends of the shaft 147 are inserted in holes (not illustrated) formed in the non-illustrated support member. With this structure, the pivot member 145 is supported by the support member such that the pivot member 145 is pivotally movable about an axis of the shaft 147.

The arm 148 extends generally upward from the float 146. The arm 148 has an upper end provided with the detection-target portion 149. The detection-target portion 149 is a plate-like member extending in the up-down direction 7 and front-rear direction 8. The detection-target portion 149 is made from a material (or is colored) capable of shielding light emitted from a light emitting portion of the liquid-level sensor 155.

In a case where a level of the ink stored in the storage chamber 121 is equal to or higher than a boundary position P1, the pivot member 145 is pivotally moved in the direction of the arrow 198 because of buoyancy acting on the float 146 and the pivot member 145 is maintained at the first position by the non-illustrated stopper. Accordingly, the detection-target portion 149 is kept at a detection position. On the other hand, in a case where the level of the ink becomes lower than the boundary position P1, the pivot member 145 is pivotally moved in the direction of the arrow 199 following the declining liquid surface of the ink. Hence, the detection-target portion 149 is displaced from the detection position. That is, the detection-target portion 149 moves to a position corresponding to an amount of the ink stored in the storage chamber 121.

The boundary position P1 is at a height equal to the position of the axis of the ink needle 102 in the up-down direction 7, and also to the position of a center of an ink supply opening 71 (see FIGS. 5 and 6, described later) of the corresponding ink cartridge 30 in the up-down direction 7. The boundary position P1 is indicated by an imaginary line extending in the horizontal direction in FIG. 4. However, the boundary position P1 need not be at the height indicated in FIG. 4, provided that the boundary position P1 is higher than the outlet port 128 in the up-down direction 7. For example, the boundary position P1 may be at the same height as an upper end or a lower end of the internal space of the ink needle 102, or may be at the same height as an upper end or a lower end of the ink supply opening 71.

In a case where the level of the ink stored in the storage chamber 121 is equal to or higher than the boundary position P1, the light emitted from the light emitting portion of the liquid-level sensor 155 is interrupted by the detection-target portion 149. Hence, since the light emitted from the light emitting portion does not reach a light receiving portion of the liquid-level sensor 155, the liquid-level sensor 155 outputs a low level signal to a controller (not illustrated) of the multifunction device 10. On the other hand, in a case where the level of the ink is lower than the boundary position P1, the light emitted from the light emitting portion reaches the light receiving portion, and, hence, the liquid-level sensor 155 outputs a high level signal to the non-illustrated controller of the multifunction device 10. In this way, the controller can determine whether the level of ink in the storage chamber 121 is at the boundary position P1 or higher based on the signals outputted from the liquid-level sensor 155.

<Ink Cartridge 30>

Figure 5:
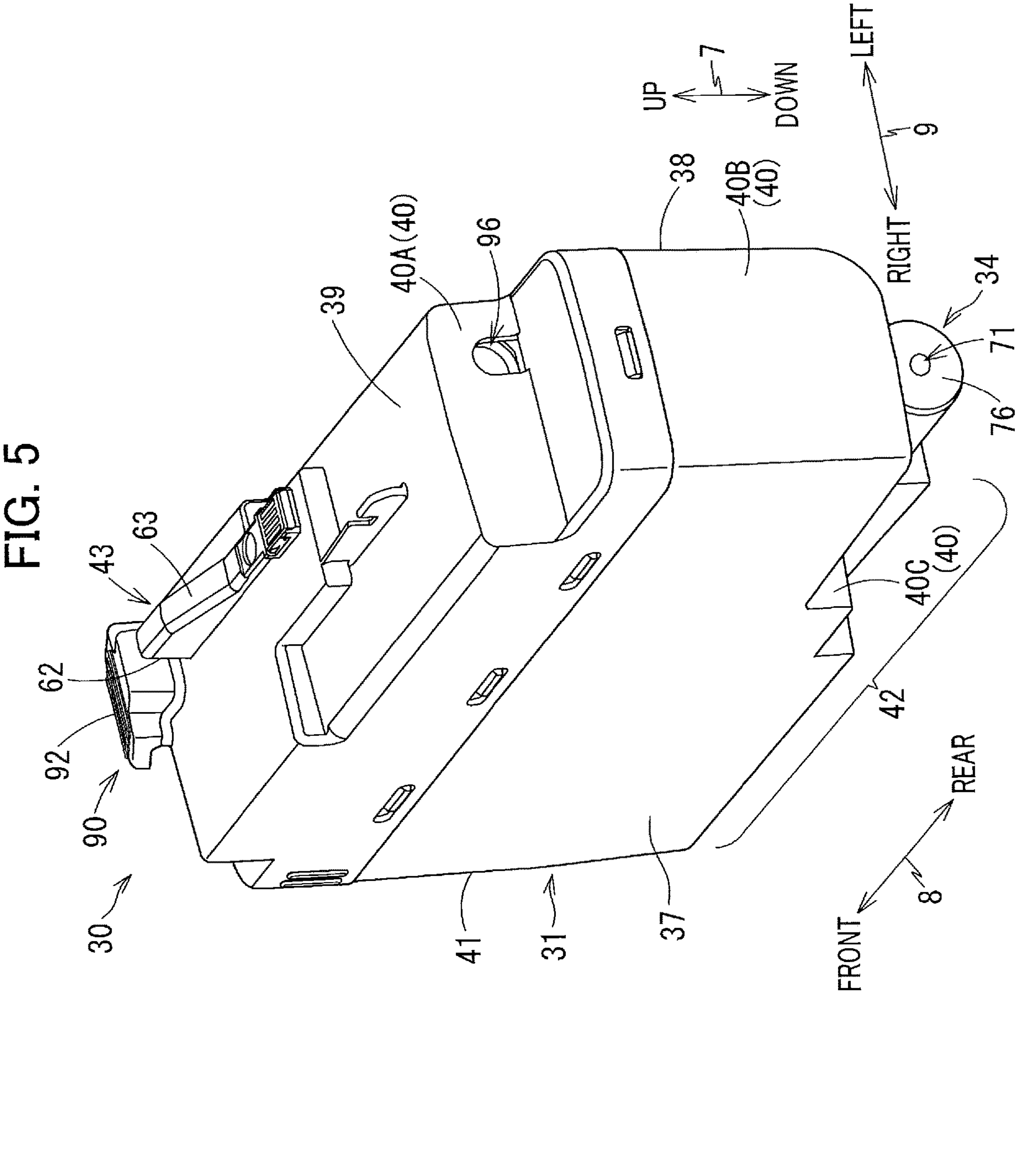
FIG. 5 is a perspective view of an ink cartridge 30 as viewed from a rear side thereof.

The ink cartridge 30 is a container configured to store ink therein. As illustrated in FIG. 5, the ink cartridge 30 includes a casing 31, the ink supply portion 34, a protruding portion 43, and an operating portion 90.

The casing 31 has a generally rectangular parallelepiped shape. The casing 31 has a generally flat shape such that dimensions thereof in the up-down direction 7 and in the front-rear direction 8 are greater than a dimension thereof in the left-right direction 9. Incidentally, the ink cartridges 30 storing different colors of ink from one another may have the same outer shape as or may have different outer shapes from one another.

The casing 31 includes a rear wall 40, a front wall 41, an upper wall 39, a lower wall 42, and a pair of side walls 37 and 38.

The rear wall 40 includes a first rear wall 40A, a second rear wall 40B, and a third rear wall 40C. The first rear wall 40A is positioned frontward of and above the second rear wall 40B. The second rear wall 40B is positioned rearward of and above the third rear wall 40C. The third rear wall 40C is positioned frontward of and below the first rear wall 40A. The air communication opening 96 is formed at the first rear wall 40A. The air communication opening 96 is positioned rearward of the ink supply opening 71 (described later) of the ink supply portion 34. The ink supply portion 34 is provided at the third rear wall 40C.

As illustrated in FIG. 6, the casing 31 of the ink cartridge 30 is roughly divided into a base part 48 and a protruding part 49. The base part 48 is provided by, for example, a front portion of the upper wall 39, the front wall 41, the lower wall 42, the third rear wall 40C, and front portions of the side walls 37, 38. The protruding part 49 is provided by, for example, a rear portion of the upper wall 39, the first rear wall 40A, the second rear wall 40B, and rear portions of the side walls 37, 38.

The protruding part 49 protrudes rearward from a portion of the base part 48. Specifically, the protruding part 49 protrudes rearward from an upper-rear portion of the base part 48. A boundary between the base part 48 and the protruding part 49 in the front-rear direction 8 may be defined by, for example, an extension line from the first rear wall 40A, or an extension line from the third rear wall 40C, or an imaginary line connecting between a lower end of the first rear wall 40A and an upper end of the third rear wall 40C.

The protruding portion 43 and the operating portion 90 are provided at the upper wall 39. The protruding portion 43 protrudes upward from an outer surface of the upper wall 39 and extends in the front-rear direction 8. The protruding portion 43 has a locking surface 62 facing frontward. The locking surface 62 is positioned above the upper wall 39. The locking surface 62 is configured to abut on the locking portion 129 of the cartridge receiving portion 110 in a state where the ink cartridge 30 is attached to the cartridge receiving portion 110. The abutment of the locking surface 62 on the locking portion 129 functions to maintain the ink cartridge 30 at the attached position against the urging force of the coil springs 78 and 98.

The operating portion 90 is positioned frontward of the locking surface 62 on the upper wall 39. The operating portion 90 has an operating surface 92. In the state where the ink cartridge 30 is accommodated in the cartridge receiving portion 110, the ink cartridge 30 is pivotally moved downward by user's depression of the operating surface 92 downward, which in turn moves the locking surface 62 downward relative to the locking portion 129. The ink cartridge 30 is thus made removable from the cartridge receiving portion 110.

As illustrated in FIG. 6, the casing 31 has an internal space which defines therein an upper storage chamber 32, a lower storage chamber 33, an ink valve chamber 35, and the air valve chamber 36. The upper storage chamber 32, the lower storage chamber 33, and the ink valve chamber 35 are configured to store ink therein. The air valve chamber 36 provides airflow between the upper storage chamber 32 and the air chamber 131 of the buffer tank 130.

The upper storage chamber 32 and the lower storage chamber 33 are positioned adjacent to each other in the up-down direction 7 and partitioned by a partitioning wall 45 in the internal space of the casing 31. The partitioning wall 45 has a through-hole 47 allowing the upper storage chamber 32 and the lower storage chamber 33 to communicate with each other. The upper storage chamber 32 has an internal volume greater than a sum of internal volumes of the lower storage chamber 33 and the ink valve chamber 35. The upper storage chamber 32 extends over the base part 48 and the protruding part 49 in the front-rear direction 8.

The upper storage chamber 32 and the air valve chamber 36 are positioned adjacent to each other in the up-down direction 7 and partitioned by a partitioning wall 44 in the internal space of the casing 31. The partitioning wall 44 has a through-hole 46 allowing the upper storage chamber 32 and the air valve chamber 36 to communicate with each other. The lower storage chamber 33 is positioned frontward of the ink valve chamber 35. The lower storage chamber 33 and the ink valve chamber 35 are in communication with each other by a through-hole 99. The sum of the internal volumes of lower storage chamber 33 and the ink valve chamber 35 is smaller than the internal volume of the storage chamber 121 of the corresponding ink tank 103. The internal volume of the air chamber 131 is smaller than the internal volume of the storage chamber 121, as described earlier.

The air valve chamber 36 functions as an airflow path positioned above the upper storage chamber 32. A labyrinth channel or a semipermeable membrane may be provided in the air valve chamber 36. A sealing member 94, a valve 97 and the coil spring 98 are accommodated in the air valve chamber 36. The sealing member 94 is a disc-like member having a through-hole which is in communication with the air communication opening 96. The sealing member 94 is in close contact with the casing 31 around the air communication opening 96 to secure air-tight sealing around the air communication opening 96. The through-hole of the sealing member 94 has an inner diameter slightly smaller than an outer diameter of the corresponding rod 125 of the cartridge receiving portion 110.

The valve 97 is movable in the front-rear direction 8 between a closed position where the valve 97 closes the through-hole of the sealing member 94 and an open position where the valve 97 opens the through-hole of the sealing member 94. In other words, the valve 97 is movable between the closed position and the open position to close and open the air communication opening 96. The coil spring 98 urges the valve 97 rearward, i.e., in a direction to move the valve 97 toward the closed position.

In a process to attach the ink cartridge 30 to the cartridge receiving portion 110, the rod 125 (see FIG. 7) of the cartridge receiving portion 110 is inserted in the air valve chamber 36 through the air communication opening 96 and the through-hole of the sealing member 94. The rod 125 inserted in the air valve chamber 36 moves the valve 97 at the closed position frontward against the urging force of the coil spring 98, thereby moving the valve 97 to the open position. As a result, the air valve chamber 36 becomes communicated with the air chamber 131 through the internal space of the rod 125, and hence, the upper storage chamber 32 is allowed to communicate with the atmosphere through the air communication port 132 of the air chamber 131.

The air communication opening 96 is positioned rearward of the ink supply opening 71. The tip end of the rod 125 and the tip end of the ink needle 102 are generally aligned with each other (generally at the same position as each other) in the front-rear direction 8. Therefore, the rod 125 can be inserted in the air communication opening 96 to establish communication with the air valve chamber 36 before communication of the ink needle 102 with the ink valve chamber 35 is established by insertion of the ink needle 102 in the ink supply opening 71.

The ink supply portion 34 protrudes rearward from the third rear wall 40C. Specifically, the ink supply portion 34 is positioned below the lower end of the protruding part 49, and preferably at a surface of the base part 48 facing rearward. The ink supply portion 34 has a hollow cylindrical shape whose internal space provides the ink valve chamber 35. The ink supply portion 34 has a protruding end that is open to the outside of the ink cartridge 30. The second rear wall 40B is positioned further rearward of the protruding end of the ink supply portion 34. A sealing member 76, a valve 77, and the coil spring 78 are accommodated in the ink valve chamber 35.

The sealing member 76 is provided at the open protruding end of the ink supply portion 34. The sealing member 76 has a generally disc-like shape having a through-hole at a diametrical center thereof. The through-hole of the sealing member 76 functions as the ink supply opening 71 of the ink supply portion 34. The ink supply opening 71 has an inner diameter slightly smaller than an outer diameter of the ink needle 102. The valve 77 is movable in the front-rear direction 8 inside the ink valve chamber 35 between a closed position where the valve 77 is in abutment with the sealing member 76 to close the ink supply opening 71 and an open position where the valve 77 is separated from the sealing member 76 to open the ink supply opening 71. The coil spring 78 urges the valve 77 rearward to move the valve 77 to the closed position.

<Ink Flow and Air Flow>

As illustrated in FIG. 7, the ink cartridge 30 can be attached to the cartridge receiving portion 110 by being moved rearward in the front-rear direction 8, and can be detached from the cartridge receiving portion 110 by being moved frontward in the front-rear direction 8. In the process to attach the ink cartridge 30 to the cartridge receiving portion 110, the ink needle 102 of the cartridge receiving portion 110 is inserted into the ink valve chamber 35 of the ink cartridge 30 through the ink supply opening 71. At this time, the ink needle 102 closely contacts the ink supply opening 71 (the inner peripheral surface of the sealing member 76 defining the ink supply opening 71) to provide light-tight sealing therebetween, while elastically deforming the sealing member 76. In accordance with further insertion of the ink cartridge 30 into the cartridge receiving portion 110, the ink needle 102 moves the valve 77 to the open position against the urging force of the coil spring 78. Further, the valve 77 moves the valve 114, which protrudes out through the opening 116 of the ink needle 102, to the open position against the urging force of the coil spring 115.

As illustrated in FIG. 7, ink is allowed to circulate between the ink valve chamber 35 of the ink supply portion 34 and the internal space of the ink needle 102 when the ink supply opening 71 is opened and the air valve chamber 36 is made to communicate with the atmosphere through the air communication port 132 of the air chamber 131. As a result, the ink stored in the upper storage chamber 32 and the lower storage chamber 33 flows into the storage chamber 121 of the ink tank 103 due to water head difference through the ink supply portion 34 and the connecting portion 107 connected to each other. The ink flowing out of the storage chamber

121 into the ejection head 21 through the outlet port 128 is configured to be ejected from the nozzles 29 in the state where the ink cartridge 30 is connected to the ink tank 103 and the buffer tank 130.

In the operable posture of the multifunction device 10 illustrated in FIG. 1A, the ink cartridge 30 and the ink tank 103 are in the state illustrated in FIG. 7. The multifunction device 10 can perform various operations such as image recording operations in the operable posture.

Hereinafter, description will be made on a case where a new ink cartridge 30 is attached to a brand-new multifunction device 10. In the new ink cartridge 30, a maximum amount of ink is stored in the upper storage chamber 32, the lower storage chamber 33, and the ink valve chamber 35. Further, in the unused multifunction device 10, no ink is stored in the storage chamber 121 of the ink tank 103. Here, "no ink is stored in the storage chamber 121" implies a state where the ink in the ink cartridge 30 has not been flowed into the storage chamber 121. That is, the "ink stored in the storage chamber 121" does not mean such ink left in the storage chamber 121 as a result of execution of the inspection of the multifunction device 10 at the time of manufacture thereof (the ink may be temporarily stored in the storage chamber 121 and then removed therefrom in the inspection of the multifunction device 10).

Immediately after the attachment of the new ink cartridge 30 to the unused multifunction device 10, that is, in a state where the ink in the ink cartridge 30 has not yet flowed into the storage chamber 121 of the ink tank 103, the level of ink stored in the ink cartridge 30 in the up-down direction 7 is shown by a level P2 as indicated by a two-dotted chain line in FIG. 7.

As illustrated in FIG. 7, upon attachment of the ink cartridge 30 to the cartridge receiving portion 110, the ink supply opening 71 is opened and the air valve chamber 36 is open to the atmosphere through the air communication port 132 of the air chamber 131, so that the ink can flow into the ink valve chamber 35 of the ink supply portion 34 and the internal space of the ink needle 102. Accordingly, the ink stored in the upper storage chamber 32 and the lower storage chamber 33 flows into the storage chamber 121 of the ink tank 103 due to water head difference through the ink supply portion 34 and the connecting portion 107 connected to each other. The ink flow between the upper and lower storage chambers 32,33 and the storage chamber 121 is terminated when the level of ink stored in the upper and lower storage chambers 32, 33 becomes equal to the level of ink stored in the storage chamber 121, that is, when the water head difference between the storage chamber 121 and the upper and lower storage chambers 32,33 disappears. The level of ink in the storage chamber 121 at this time (when the water head difference disappears after attachment of the new ink cartridge 30 to the unused multifunction device 10) is a level P3 indicated by two-dotted chain line in FIG. 7.

As illustrated in FIG. 7, the air communication port 132 of the buffer tank 130 is positioned higher than each of the level P2 and the level P3 of the ink stored in the ink cartridge 30. Further, the air communication port 124 of the ink tank 103 is positioned higher than each of the level P2 and the level P3 of the ink stored in the ink cartridge 30. Hence, in the state illustrated in FIG. 7, the ink does not contact the first semipermeable membrane 133 and the second semipermeable membrane 127.

As the ink flows into the storage chamber 121 in response to attachment of the new ink cartridge 30 to the brand-new multifunction device 10, the ink is to be stored in the storage chamber 121 to elevate the ink level in the storage chamber 121. In the ink cartridge 30, in response to the outflow of the ink therefrom, air flows into the upper storage chamber 32 through the first semipermeable membrane 133 covering the air communication port 132, the air chamber 131, the internal space of the rod 125, the air valve chamber 36, and the through-hole 46. On the other hand, in the ink tank 103, air in the storage chamber 121 flows out of the storage chamber 121, in response to the inflow of ink into the storage chamber 121, through the second semipermeable membrane 127 covering the air communication port 124.

In the state illustrated in FIG. 7, the ink stored in the storage chamber 121 of the ink tank 103 flows into the ejection head 21 through the outlet port 128 in accordance with the ejection of ink from the ejection head 21. The level of ink in the storage chamber 121 is lowered down, and ambient air of a certain volume is taken into the storage chamber 121 through the second semipermeable membrane 127 and the air communication port 124, the certain volume being equivalent to a volume of the ink flowing out of the storage chamber 121.

Further, the ink stored in the upper storage chamber 32 and lower storage chamber 33 of the ink cartridge 30 flows into the storage chamber 121 through the ink needle 102. The level of ink in the upper storage chamber 32 is lowered down, and a certain volume of ambient air (corresponding to the volume of the ink flowing out of the upper storage chamber 32) flows into the upper storage chamber 32 through the first semipermeable membrane 133, the air communication port 132, the air chamber 131, and the air valve chamber 36. Since the flow resistance R2 of the second semipermeable membrane 127 is greater than the flow resistance R1 of the first semipermeable membrane 133 ($R1<R2$), the flow rate of the ink flowing out of the outlet port 128 from the lower storage chamber 33 of the ink cartridge 30 through the storage chamber 121 is higher than the flow rate of the ink flowing out of the outlet port 128 from the storage chamber 121, in accordance with the ejection of ink from the ejection head 21. That is, the ink stored in the lower storage chamber 33 is more likely to flow out of the outlet port 128 than the ink stored in the storage chamber 121 of the ink tank 103 flows out of the outlet port 128.

FIG. 8 illustrates a state where the multifunction device 10 is turned into an abnormal posture (referred to as "collapsed posture") for some reason. In the collapsed posture of the multifunction device 10, the ink cartridge 30 connected to the ink tank 103 and the buffer tank 130 is positioned above the ink tank 103 and the buffer tank 130. In the collapsed posture, the rear surface of the multifunction device 10 (rear wall 40) comes to the bottom, and the front surface of the multifunction device 10 (front wall 41) comes to the top. In the collapsed posture, ambient air can flow into the upper storage chamber 32 and the lower storage chamber 33 through the first semipermeable membrane 133, the air communication port 132, the air valve chamber 36, and the through-hole 46.

In the collapsed posture, the second semipermeable membrane 127 contacts the ink in the storage chamber 121, since the air communication port 124 and the second semipermeable membrane 127 are provided at the rear wall 143 of the ink tank 103. That is, ambient air cannot pass through the second semipermeable membrane 127. Accordingly, in the operable posture, the ink in the lower storage chamber 33 of the ink cartridge 30 does not continuously flow into the storage chamber 121 of the ink tank 103.

Operational and Technical Advantages According to the Embodiment

According to the above-described embodiment, in the state where the ink cartridge 30 is connected to the ink tank 103 and the buffer tank 130, ambient air passing through the first semipermeable membrane 133 covering the air communication port 132 flows into the upper storage chamber 32 through the airflow path including the air chamber 131, the internal space of the rod 125, and the first semipermeable membrane 133. As such, the flow resistance for this airflow path can be set to an optimum value to realize the ink flow from the upper storage chamber 32 and the lower storage chamber 33 into the storage chamber 121. On the other hand, since the ambient air passing through the second semipermeable membrane 127 covering the air communication port 124 flows into the storage chamber 121, the flow resistance for the airflow through the second semipermeable membrane 127 can be set to an optimum value for enabling the ink stored in the storage chamber 121 to flow out of the outlet port 128. Further, the structure of the ink cartridge 30 can be simplified, since no air communicating portion is necessary in the ink cartridge 30.

Further, in the collapsed posture, air communication between the storage chamber 121 and the atmosphere is interrupted, since the second semipermeable membrane 127 covering the air communication port 124 is closed or plugged by the ink stored in the storage chamber 121. With this configuration, due to the interruption of airflow into the storage chamber 121, the ink in the storage chamber 121 is less likely to flow out therefrom into the ejection head 21 through the outlet port 128.

Further, the air communication opening 96 of the ink cartridge 30 is positioned rearward of the ink supply opening 71, and the rod 125 is inserted in the air communication opening 96 to provide communication of air between the air chamber 131 and the air valve chamber 36 before the ink needle 102 is inserted in the ink supply opening 71 to provide communication of ink between the storage chamber 121 and the ink valve chamber 35. Accordingly, the communication between the ink needle 102 and the ink valve chamber 35 is established after the air layer in the upper storage chamber 32 of the ink cartridge 30 becomes the atmospheric pressure. This configuration can restrain abrupt outflow of ink from the ink cartridge 30 and abrupt outflow of ink from the ink tank 103 into the ink cartridge 30 upon attachment of the ink cartridge 30 to the cartridge receiving portion 110.

Further, the flow resistance R2 of the second semipermeable membrane 127 is greater than the flow resistance R1 of the first semipermeable membrane 133 ($R1<R2$). In accordance with the ejection of ink from the ejection head 21, the ink stored in the ink tank 103 and the ink stored in the ink cartridge 30 decrease. Since the flow resistance R2 is higher than the flow resistance R1, ambient air tends to flow into the ink cartridge 30, rather than into the ink tank 103. This means that the level of ink in the ink cartridge 30 is more likely to be lowered, compared to the level of ink in the ink tank 103. That is, with respect to the amount of ink flowing into the ejection head 21, the ratio of the ink coming from the ink cartridge 30 to the ejection head 21 is higher than the ratio of the ink coming from the ink tank 103 to the ejection head 21.

Accordingly, in a case where a large amount of ink is ejected from the ejection head 21 (such as photo-printing and a maintenance checkup to the ejection head 21), the level of ink in the ink tank 103 is less likely to decrease relative to the level of ink in the ink cartridge 30. Hence, the ink level in the ink tank 103 hardly becomes lower than the boundary position P1 to make the liquid-level sensor 155 output a high level signal, despite the fact that the ink level in the ink cartridge 30 is still higher than the boundary position P1. Thus, the liquid-level sensor 155 can accurately detect the amount of ink left in the storage chamber 121 of the ink tank 103. Further, the ink level in the ink cartridge 30 can be lower than the ink level in the ink tank 103 upon termination of an image recording operation. As such, after the image recording operation, the ink in the ink cartridge 30 does not flow into the ink tank 103, and the level of ink in the ink tank 103 does not go up.

Further, since the level of ink in the ink cartridge 30 can be lower than the level of ink in the ink tank 103, the lower storage chamber 33 of the ink cartridge 30 becomes empty before the liquid surface of the ink in the ink tank 103 reaches the boundary position P1. Thereafter, as the ink is further ejected from the ejection head 21, ambient air is introduced into the storage chamber 121 of the ink tank 103 through the first semipermeable membrane 133 and the second semipermeable membrane 127. Since the flow resistance R2 is higher than the flow resistance R1, ambient air tends to be introduced into the storage chamber 121 of the ink tank 103 through the ink cartridge 30. Hence, ink is unlikely to remain in the ink cartridge 30, thereby promoting use up of the ink in the ink cartridge 30.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, in the above-described embodiment, the boundary position P1 is at the same height as the axis of the ink needle 102 and also at the same height as the center of the ink supply opening 71 in the up-down direction 7. However, the boundary position P1 may be higher than or lower than the axis of the ink needle 102.

As an example, FIG. 9 illustrates a cartridge receiving portion 210 according to a first modification to the embodiment where the boundary position P1 is set to be higher than the axis of the ink needle 102 in the up-down direction 7. With this structure, air is less likely to flow into the ink tank 103 from the ink cartridge 30 when the level of ink reaches the boundary position P1. Hence, air bubbles are less likely to adhere to the pivot member 145, and the pivotal movement of the pivot member 145 is less likely to be impeded by the air bubbles when the level of ink reaches the boundary position P1.

Alternatively, FIG. 10 illustrates a cartridge receiving portion 310 according to a second modification where the boundary position P1 is set at a position lower than the axis of the ink needle 102 in the up-down direction 7. With this configuration, the lower storage chamber 33 of the ink cartridge 30 becomes empty before the level of ink in the ink tank 103 reaches the boundary position P1; and thereafter the ink and air bubbles remaining in the lower storage chamber 33 and the upper storage chamber 32 flow into the ink tank 103 as time elapses. In this way, the ink left in the ink cartridge 30 can fully move into the ink tank 103 before the level of ink in the ink tank 103 reaches the boundary position P1.

Incidentally, in the above-described embodiment, the pivot member 145 is provided in the storage chamber 121, and the liquid-level sensor 155 is configured to detect the detection-target portion 149 of the pivot member 145. However, a conventional structure may be used instead of the pivot member 145. For example, a prism may be provided on an inner surface of the rear wall 143 of the ink tank 103 at the same height as the boundary position P1 in the up-down direction 7. The prism is configured to provide different reflection coefficients with respect to light depending on whether or not the ink contacts the prism, and the liquid-level sensor 155 may be configured to detect the light reflected by the prism. Alternatively, instead of the pivot member 145, a pair of electrodes may be disposed in the storage chamber 121. Whether or not current flows between the two electrodes may be detected depending on whether the electrodes are in contact with the ink or not.

Further, in the above-described embodiment, the air communication port 124 is provided on the rear wall 143 of the ink tank 103. However, the air communication port 124 may be provided on the upper wall or the side wall of the ink tank 103, instead of the rear wall 143. In a case where the air communication port 124 is positioned on the upper wall or the side wall, preferably, the air communication port 124 be at a position rearward (toward the bottom in the collapsed posture) relative to a front-rear center of the upper wall or the side wall with respect to the front-rear direction 8.

Further, instead of the first semipermeable membrane 133 and the second semipermeable membrane 127, foamed resin members (which allow airflow therethrough) may be provided at the air communication port 124 and the air communication port 132, respectively, to close the same.

Incidentally, the air communication opening 96 of the ink cartridge 30 may be opened and closed through a structure other than the valve mechanism described in the above-described embodiment. For example, an elastic member may be provided to seal the air communication opening 96, and the rod 125 may have a pointed tip end to penetrate the elastic member.

Still further, while the ink tank 103 and the buffer tank 130 of the above-described embodiment are respectively different products made from resin, the ink tank 103 and the buffer tank 130 may be integral with each other as an integral resin molded product.

For example, FIG. 11 illustrates a cartridge receiving portion 410 according to a third modification to the embodiment where an ink tank 403 (corresponding to the ink tank 103) and a buffer tank 430 (corresponding to the buffer tank 130) are made integral with each other. In the cartridge receiving portion 410, an air communication port 424 of the ink tank 403 and an air communication port 432 of the buffer tank 430 are formed in respective upper walls of the ink tank 403 and the buffer tank 430, and a single semipermeable membrane 436 covers both of the air communication ports 424 and 432. It should be noted here that, although the single semipermeable membrane 436 covers both of the air communication ports 424 and 432 at the same time in this example, the buffer tank 430 and the ink tank 403 respectively define independent chambers (the air chamber 131 and storage chamber 121) which are not in communication with each other. The internal volume of the air chamber 131 is smaller than the internal volume of the storage chamber 121, as in the embodiment.

In the described embodiment, the ink cartridge 30 is configured to be attached to and detached from the cartridge receiving portion 110 by being moved in the front-rear direction 8. However, the ink cartridge 30 need not be moved in the front-rear direction 8. For example, FIG. 12 illustrates a configuration according to a fourth modification where an ink cartridge 50 is configured to be attached to and detached from a cartridge receiving portion 510 in the up-down direction 7.

Specifically, referring to FIG. 12, the ink cartridge 50 includes a casing 51 having an internal space divided into an ink storage chamber 53 and an air chamber 54 by a partition wall 52. A through-hole 56 is formed in an upper end portion of the partition wall 52 to provide communication of air between the ink storage chamber 53 and the air chamber 54.

The casing 51 has a lower wall provided with connecting portions 57, 58. Although not illustrated in detail in FIG. 12, the connecting portion 57 has a structure the same as that of the ink supply portion 34. The connecting portion 57 has an opening through which the ink in the ink storage chamber 53 can flow out, and a valve is provided for opening and closing the opening. The connecting portion 58 has a structure the same as that of the air valve chamber 36. The connecting portion 58 has an opening in communication with the air chamber 54, and a valve is provided for opening and closing the opening.

The cartridge receiving portion 510 includes an ink tank 550 having a generally L-shape in a side view. The ink tank 550 has a first upper wall formed with an air communication port 551 which is covered with a second semipermeable membrane 552. The ink tank 550 has an internal space functioning as a storage chamber 553 for storing ink. The ink tank 550 has a second upper wall 554 lower than the first upper wall, and an ink needle 555 extends upward from the second upper wall 554. The ink needle 555 has an internal space in communication with the ink storage chamber 553. The ink needle 555 can be inserted in the connecting portion 57 of the ink cartridge 50. The storage chamber 553 has an outlet opening 556 through which the ink in the storage chamber 553 is configured to flow out to the ejection head 21.

A buffer tank 560 is positioned frontward of the ink tank 550. The buffer tank 560 has a box-like shape whose internal space functions as an air chamber 561. The buffer tank 560 has an upper wall formed with an air communication port 562 which is closed by a first semipermeable membrane 563. A rod 564 extends upward from the upper wall of the buffer tank 560. The rod 564 has a hollow cylindrical shape whose hollow space is in communication with the air chamber 561. The rod 564 can be inserted in the connecting portion 58 of the ink cartridge 50. In this example, since the buffer tank 560 is a separate member from the ink tank 550, the air chamber 561 in the buffer tank 560 and the storage chamber 553 in the ink tank 550 are respectively independent chambers which are not in communication with each other. The air chamber 561 has an internal volume which is smaller than an internal volume of the storage chamber 553, as in the embodiment.

As illustrated in FIG. 12, the ink cartridge 50 is connected to the ink tank 550 and the buffer tank 560 by being moved downward toward the ink tank 550 and the buffer tank 560. In a process to move the ink cartridge 50 downward, the ink needle 555 is inserted in the connecting portion 57 of the ink cartridge 50, and the rod 564 is inserted in the connecting portion 58 of the ink cartridge 50. Hence, the ink storage chamber 53 of the ink cartridge 50 is communicated with the atmosphere through the air chamber 54, the air chamber 561 and the air communication port 562. Accordingly, the ink stored in the ink storage chamber 53 of the ink cartridge 50 can flow into the storage chamber 553 of the ink tank 550 due to the water head difference.

FIG. 13 illustrates another configuration according to a fifth modification to the embodiment where a bottle 670 (instead of the ink cartridge 30) is configured to be attached to and detached from a cartridge receiving portion 710. Specifically, the bottle 670 is connectable to an ink tank 780 and a buffer tank 790 of the cartridge receiving portion 710. The bottle 670 includes a casing 671 and a partition wall 672 dividing an internal space of the casing 671 into a storage chamber 673 and an air chamber 674. The partition wall 672 has an upper end portion formed with a through-hole 675. The through-hole 675 allows circulation of air between the storage chamber 673 and the air chamber 674.

The casing 671 has a bottom wall provided with connecting portions 676 and 677. Although not illustrated in detail in FIG. 13, the connecting portion 676 has a structure the same as that of the ink supply portion 34. The connecting portion 676 has an opening through which the ink in the storage chamber 673 can flow out therefrom, and a valve is provided for opening and closing the opening. The connecting portion 677 has a structure the same as that of the air valve chamber 36. The connecting portion 677 has an opening in communication with the air chamber 674 and a valve is provided for opening and closing the opening.

The ink tank 780 has a generally L-shape in a side view. The ink tank 780 has an upper wall formed with an air communication port 781 which is covered with a second semipermeable membrane 782. The ink tank 780 has an internal space functioning as a storage chamber 783 for storing ink. An ink needle 785 extends upward from the upper wall of the ink tank 780. The ink needle 785 has an internal space in communication with the storage chamber 783. The ink needle 785 can be inserted in the connecting portion 676 of the bottle 670. The storage chamber 783 has an outlet opening 786 through which the ink in the storage chamber 783 is configured to flow out to the ejection head 21.

The buffer tank 790 is positioned rearward of and above the ink tank 780. The buffer tank 790 has a box-like shape whose internal space functions as an air chamber 791. That is, the air chamber 791 is an independent space that is not in communication with the storage chamber 783. The buffer tank 790 has a rear wall formed with an air communication port 792 which is closed by a first semipermeable membrane 793. A rod 794 extends upward from the upper wall of the buffer tank 790. The rod 794 has a hollow cylindrical shape whose hollow space is in communication with the air chamber 791. The rod 794 can be inserted in the connecting portion 677 of the bottle 670. In this example as well, the air chamber 791 has an internal volume that is smaller than an internal volume of the storage chamber 783.

As illustrated in FIG. 13, the bottle 670 is connectable to the ink tank 780 and the buffer tank 790 by being moved downward toward the ink tank 780 and the buffer tank 790. The bottle 670 is for replenishing ink therein to the storage chamber 783 of the ink tank 780, and, hence, the bottle 670 is not always connected to the ink tank 780 and the buffer tank 790. Accordingly, the ejection head 21 can eject the ink flowing out of the storage chamber 783 in a state where the bottle 670 is not connected to the ink tank 780 and the buffer tank 790.

In a process to move the bottle 670 downward, the ink needle 785 is inserted in the connecting portion 676 of the bottle 670, and the rod 794 is inserted in the connecting portion 677 of the bottle 670. Accordingly, the storage chamber 673 of the bottle 670 is communicated with the atmosphere through the air chamber 674, the air chamber 791 and the air communication port 792. The ink stored in the storage chamber 673 of the bottle 670 can thus flow into the storage chamber 783 of the ink tank 780 due to the water head difference.

[Remarks]

The multifunction device 10 is an example of a liquid consuming device. The ink cartridges 30, 50 and the bottle 670 are examples of a liquid container. The buffer tanks 130, 430, 560, 790 are examples of an air tank. The ink tanks 103, 403, 550, 780 are examples of a liquid tank. The ejection head 21 is an example of an ejection head. The upper storage chamber 32, the lower storage chamber 33 and the ink valve chamber 35 are an example of a first storage chamber of the liquid container. The ink storage chamber 53 and storage chamber 673 are other examples of the first storage chamber of the liquid container. The rods 125, 564, 794 are examples of an air flow path. The air chambers 131, 561, 791 are examples of an air chamber. The air communication ports 132, 432, 562, 792 are examples of a first communicating portion. The ink needles 102, 555, 785 are examples of liquid flow path. The storage chambers 121, 553, 783 are examples of a second storage chamber. The outlet port 128 is an example of a liquid outlet port. The air communication ports 124, 424, 551, 781 are examples of a second air communicating portion. The air communication opening 96 is an example of an air communication opening. The ink supply opening 71 is an example of a liquid communication opening. The first semipermeable membranes 133, 563, 793 are examples of a first semipermeable membrane. The second semipermeable membranes 127, 552, 782 are examples of a second semipermeable membrane. The liquid-level sensor 155 and pivot member 145 are an example of a detector. The rearward direction is an example of a first direction, and the frontward direction is an example of a second direction. The air valve chamber 36 is an example of a container air chamber. The valve 97 is an example of a valve, and the coil spring 98 is an example of a spring in the container air chamber.

What is claimed is:

1. A liquid consuming device comprising:

a liquid container comprising a first storage chamber configured to store liquid therein;

an air tank to which the liquid container is connectable, the air tank comprising:

an air flow path configured to communicate with the first storage chamber of the liquid container that is connected to the air tank;

an air chamber connected to the air flow path and configured to communicate with the first storage chamber through the air flow path to provide airflow between the first storage chamber and the air chamber; and a first air communicating portion configured to allow the air chamber to communicate with an atmosphere;

a liquid tank to which the liquid container is connectable, the liquid tank comprising:

a liquid flow path configured to communicate with the first storage chamber of the liquid container that is connected to the liquid tank;

a second storage chamber connected to the liquid flow path and configured to communicate with the first storage chamber through the liquid flow path to allow the liquid stored in the first storage chamber to flow into the second storage chamber;

a liquid outlet port through which the liquid stored in the second storage chamber is configured to flow out therefrom; and a second air communicating portion configured to allow the second storage chamber to communicate with the atmosphere; and an ejection head configured to eject the liquid supplied from the second storage chamber through the liquid outlet port, wherein the air flow path is configured to provide communication between the first storage chamber and the air chamber in a state where the liquid container is connected to the air tank and the liquid tank.

2. The liquid consuming device according to claim 1, wherein the ejection head is configured to consume the liquid in the state where the liquid container is connected to the air tank and the liquid tank.

3. The liquid consuming device according to claim 1, wherein the liquid container is configured to be moved in a first direction crossing a vertical direction to be connected to the air tank and the liquid tank, and wherein the liquid container is configured to be moved in a second direction opposite to the first direction to be removed from the air tank and the liquid tank.

4. The liquid consuming device according to claim 3, wherein the liquid container has:

an air communication opening connectable to the air flow path; and a liquid communication opening connectable to the liquid flow path, the air communication opening being positioned further in the first direction relative to the liquid communication opening.

5. The liquid consuming device according to claim 4, wherein the liquid communication opening is configured to be connected to the liquid flow path after the air communication opening is connected to the air flow path in a process that the liquid container is moved in the first direction to be connected to the air tank and the liquid tank.

6. The liquid consuming device according to claim 1, wherein the first air communicating portion has an opening that is open to the atmosphere, and wherein, in the state where the liquid container is connected to the air tank and the liquid tank, the opening of the first air communicating portion is positioned above a level of the liquid stored in the first storage chamber.

7. The liquid consuming device according to claim 1, wherein the second air communicating portion has an opening that is open to the atmosphere, and wherein, in the state where the liquid container is connected to the air tank and the liquid tank, the opening of the second air communicating portion is positioned above a level of the liquid stored in the first storage chamber.

8. The liquid consuming device according to claim 7, wherein the liquid consuming device is in a collapsed posture when the liquid container connected to the air tank and the liquid tank is positioned above the air tank and the liquid tank, and wherein, in a state where the liquid consuming device is in the collapsed posture, the opening of the second air communicating portion is positioned at a bottom of the second storage chamber.

9. The liquid consuming device according to claim 1, wherein the ejection head is configured to consume the liquid in the second storage chamber in a state where the liquid container is disconnected from the air tank and the liquid tank.

10. The liquid consuming device according to claim 1, further comprising:

a first semipermeable membrane provided to close the first air communicating portion and configured to allow air to flow through the first semipermeable membrane; and a second semipermeable membrane provided to close the second air communicating portion and configured to allow air to flow through the second semipermeable membrane.

11. The liquid consuming device according to claim 10, wherein the first semipermeable membrane has a flow resistance that is lower than a flow resistance of the second semipermeable membrane.

12. The liquid consuming device according to claim 1, wherein the air tank and the liquid tank are integral with each other as an integral resin molded product.

13. The liquid consuming device according to claim 1, wherein the air tank and the liquid tank are resin molded products independent of each other.

14. The liquid consuming device according to claim 1, further comprising a detector configured to detect whether a level of the liquid stored in the liquid tank is below a threshold liquid level.

15. The liquid consuming device according to claim 1, wherein the air chamber has a volume which is smaller than a volume of the second storage chamber.

16. The liquid consuming device according to claim 1, wherein the liquid container further comprises a container air chamber in communication with the first storage chamber, and wherein the air flow path is configured to provide communication between the first storage chamber and the air chamber via the container air chamber in the state where the liquid container is connected to the air tank and the liquid tank.

17. The liquid consuming device according to claim 16, wherein the liquid container has an air communication opening through which the container air chamber is configured to communicate with the atmosphere, wherein the liquid container further comprises:

a valve provided in the container air chamber and movable between a closed position where the valve closes the air communication opening and an open position where the valve opens the air communication opening; and a spring urging the valve toward the closed position in the container air chamber, and wherein the valve is at the open position in the state where the liquid container is connected to the air tank and the liquid tank.

18. A liquid consuming device comprising:

a liquid container comprising a first storage chamber configured to store liquid therein;

an air flow path configured to communicate with the first storage chamber of the liquid container;

an air chamber connected to the air flow path and configured to communicate with the first storage chamber through the air flow path to provide airflow between the first storage chamber and the air chamber;

a first air communicating portion configured to allow the air chamber to communicate with an atmosphere;

a liquid flow path configured to communicate with the first storage chamber of the liquid container;

a second storage chamber connected to the liquid flow path and configured to communicate with the first storage chamber through the liquid flow path to allow the liquid stored in the first storage chamber to flow into the second storage chamber;

a liquid outlet port through which the liquid stored in the second storage chamber is configured to flow out therefrom;

a second air communicating portion configured to allow the second storage chamber to communicate with the atmosphere; and an ejection head configured to eject the liquid supplied from the second storage chamber through the liquid outlet port, wherein the air flow path is configured to provide communication between the first storage chamber and the air chamber in a state where the first storage chamber is in communication with the second storage chamber, wherein the second storage chamber and the air chamber are not in communication with each other in a state where the first storage chamber is not in communication with each of the second storage chamber and the air chamber, and wherein the air chamber has a volume which is smaller than a volume of the second storage chamber.

19. The liquid consuming device according to claim 18, wherein the liquid container further comprises a container air chamber in communication with the first storage chamber, and wherein the air flow path is configured to provide communication between the first storage chamber and the air chamber via the container air chamber in the state where the first storage chamber is in communication with the second storage chamber.

20. The liquid consuming device according to claim 19, wherein the liquid container has an air communication opening through which the container air chamber is configured to communicate with the atmosphere, wherein the liquid container further comprises:

a valve provided in the container air chamber and movable between a closed position where the valve closes the air communication opening and an open position where the valve opens the air communication opening; and a spring urging the valve toward the closed position in the container air chamber, and wherein the valve is at the open position in the state where the first storage chamber is in communication with the second storage chamber.

* * * * *